(12) United States Patent
Paluri et al.

(10) Patent No.: US 11,570,429 B2
(45) Date of Patent: *Jan. 31, 2023

(54) METHOD AND DEVICE FOR PROCESSING VIDEO SIGNAL BY USING INTER PREDICTION

(71) Applicant: LG ELECTRONICS INC., Seoul (KR)

(72) Inventors: Seethal Paluri, Seoul (KR); Seunghwan Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/306,212

(22) Filed: May 3, 2021

(65) Prior Publication Data

US 2021/0266526 A1  Aug. 26, 2021

Related U.S. Application Data

(63) Continuation of application No. 16/942,040, filed on Jul. 29, 2020, now Pat. No. 11,044,468, which is a
(Continued)

(51) Int. Cl.
*H04N 19/105* (2014.01)
*H04N 19/503* (2014.01)
*H04N 19/70* (2014.01)

(52) U.S. Cl.
CPC ......... *H04N 19/105* (2014.11); *H04N 19/503* (2014.11); *H04N 19/70* (2014.11)

(58) Field of Classification Search
None
See application file for complete search history.

(56) References Cited

U.S. PATENT DOCUMENTS 10,321,154 B2   6/2019  Hendry ............... H04N 19/44
11,044,468 B2 * 6/2021  Paluri ................. H04N 19/105
(Continued)

FOREIGN PATENT DOCUMENTS

KR  10-2014-0077892 A   6/2014
KR  10-2014-0085492 A   7/2014
(Continued)

OTHER PUBLICATIONS

B. Bross et al., "Versatile Video Coding (Draft 2)", Joint Video Experts Team (JVET) of ITU-T SG 16 WP 3 and ISO/IEC JTC 1/SC 29/WG 11, Jul. 10-18, 2018, JVET-K1001-v6.
(Continued)

*Primary Examiner* — Lindsay J Uhl
(74) *Attorney, Agent, or Firm* — Dentons US LLP

(57) ABSTRACT

Embodiments of the disclosure provide methods and devices for decoding video signals using inter prediction. According to an embodiment of the disclosure, a method for processing a video signal comprises constructing a reference picture list of a current picture in the video signal and performing a prediction for a current picture by using the reference picture list, wherein constructing the reference picture list comprising, if a first entry of the reference picture list corresponds to a short-term reference picture (STRP), obtaining a picture order count (POC) difference between a picture related to the first entry and another picture, and if a second entry of the reference picture list corresponds to a long-term reference picture (LTRP), obtaining a POC modulo value of a picture related to the second entry. A reference picture list for identifying a picture may be generated in a simplified and effective manner. Thus, the compression performance may be increased, and the computation time may be decreased.

20 Claims, 14 Drawing Sheets

Related U.S. Application Data continuation of application No. PCT/KR2020/000032, filed on Jan. 2, 2020.

(60) Provisional application No. 62/787,384, filed on Jan. 2, 2019.

(56) References Cited

U.S. PATENT DOCUMENTS

| | | | |
|---|---|---|---|
| 2013/0070630 A1 | 3/2013 | Huang et al. | |
| 2013/0114741 A1* | 5/2013 | Sullivan | H04N 19/423 375/E7.026 |
| 2014/0140406 A1 | 5/2014 | Yu et al. | |
| 2014/0233647 A1 | 8/2014 | Hendry et al. | |
| 2015/0103881 A1* | 4/2015 | Hendry | H04N 7/00 375/240.02 |
| 2016/0212437 A1 | 7/2016 | Tsukuba et al. | |

FOREIGN PATENT DOCUMENTS

| | | |
|---|---|---|
| KR | 10-2017-0012597 A | 2/2017 |
| RU | 2584510 C2 | 5/2016 |
| RU | 2633165 A | 10/2017 |
| WO | 2014078013 A1 | 5/2014 |
| WO | 2015053120 A1 | 4/2015 |

OTHER PUBLICATIONS

YK, Wang, "On reference picture management for VVC", Joint Video Experts Team (JVET) of ITU-T SG 16 WP 3 and ISO/IEC JTC 1/SC 29/WG 11, Oct. 3-12, 2018, JVET-L0112-v3.

YK Wang, "On reference picture management for VVC", Joint Video Experts Team (JVET) of ITU-T SG 16 WP 3 and ISO/IEC JTC 1/SC 29/WG 11, Jan. 9-18, 2019, JVET-M0128-v1.

B. Bross, "Versatile Video Coding (Draft 2)", Joint Video Experts Team (JVET) of ITU-T SG 16 WP 3 and ISO/IEC JTC 1/SC 29/WG 11, Jul. 10-18, 2018, JVET-K1001-v6.

JVET-L0112-v4 (draft)—Wang, et al., Joint Video Experts Team (JVET) of ITU-T SG 16 WP 3 and ISO/IEC JTC 1/SC 29/ WG11 12th Meeting, Macao, CN, Oct. 3-12, 2018, "On Reference picture management for VVC," Huawei Technologies, Co., Ltd. (15 Pages).

JVET-10450-v2 (draft)—Deshpande et al., Joint Video Experts Team (JVET) of ITU-T SG 16 WP 3 and ISO/IE JTC1/SC29/WG11,12th Meeting, Macao, CN, Oct. 3-12, 2018, "On Reference Pictures Signaling and Management for VVC," Sharp Labs of America, Inc., (6 Pages).

International Search Report from PCT/KR2020/000032, dated Apr. 13, 2020.

* cited by examiner

[Fig. 1]
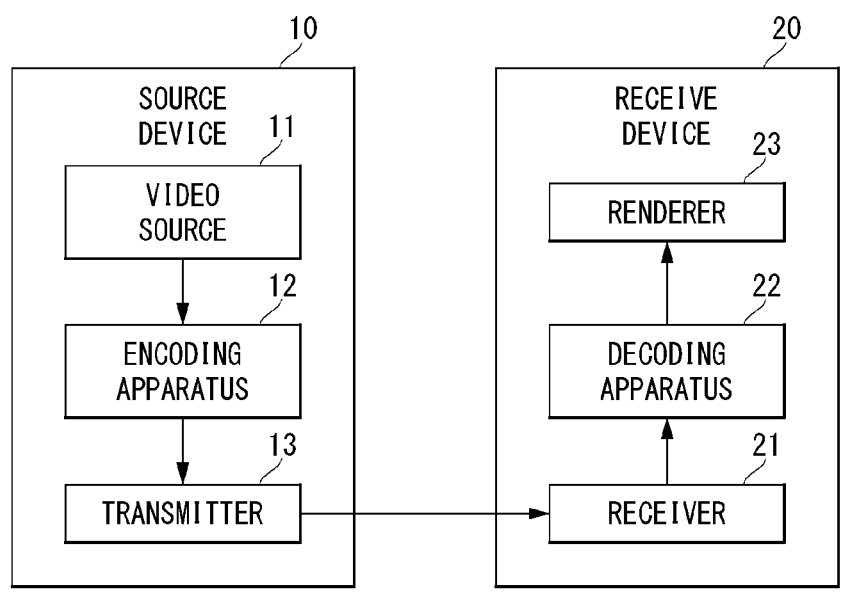

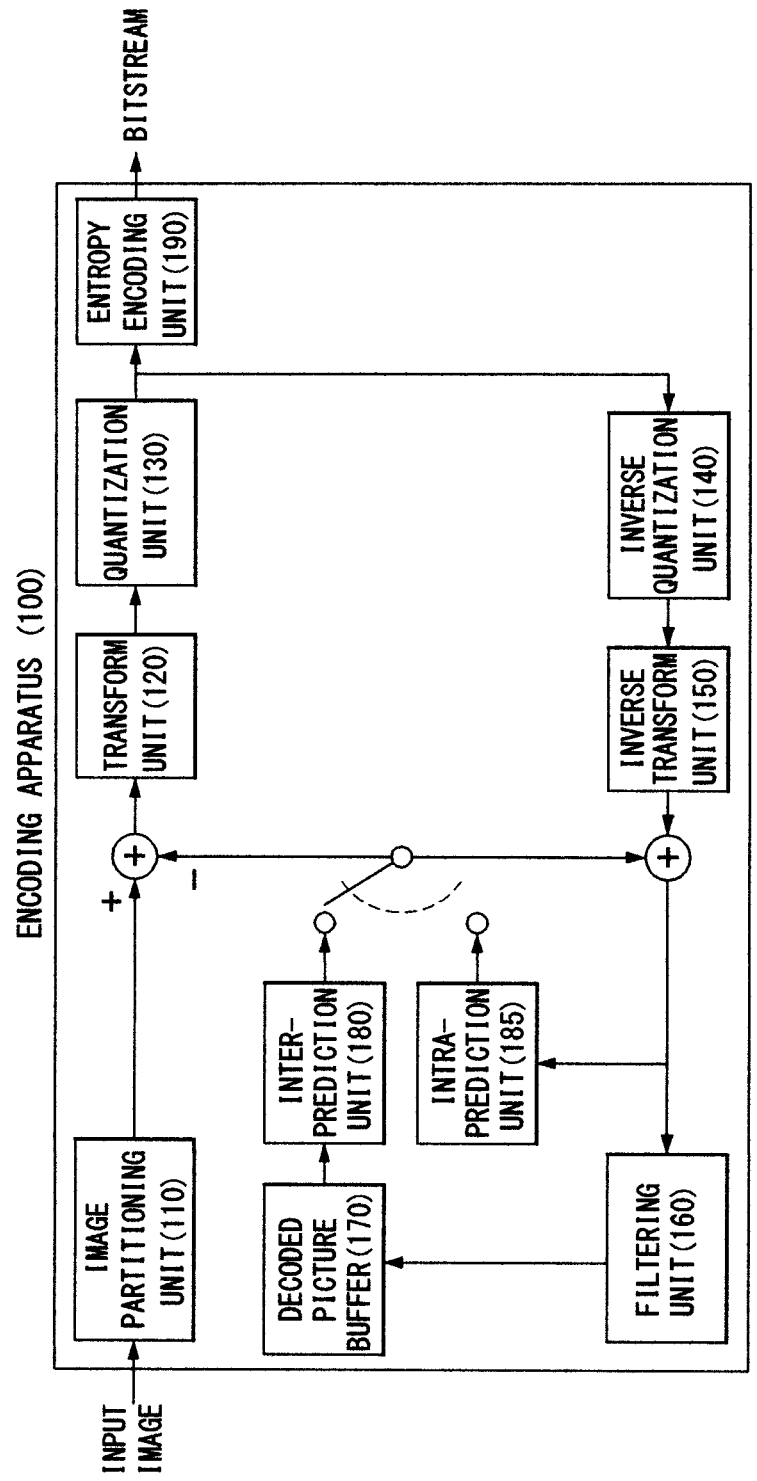
[Fig. 2]

[Fig. 3]
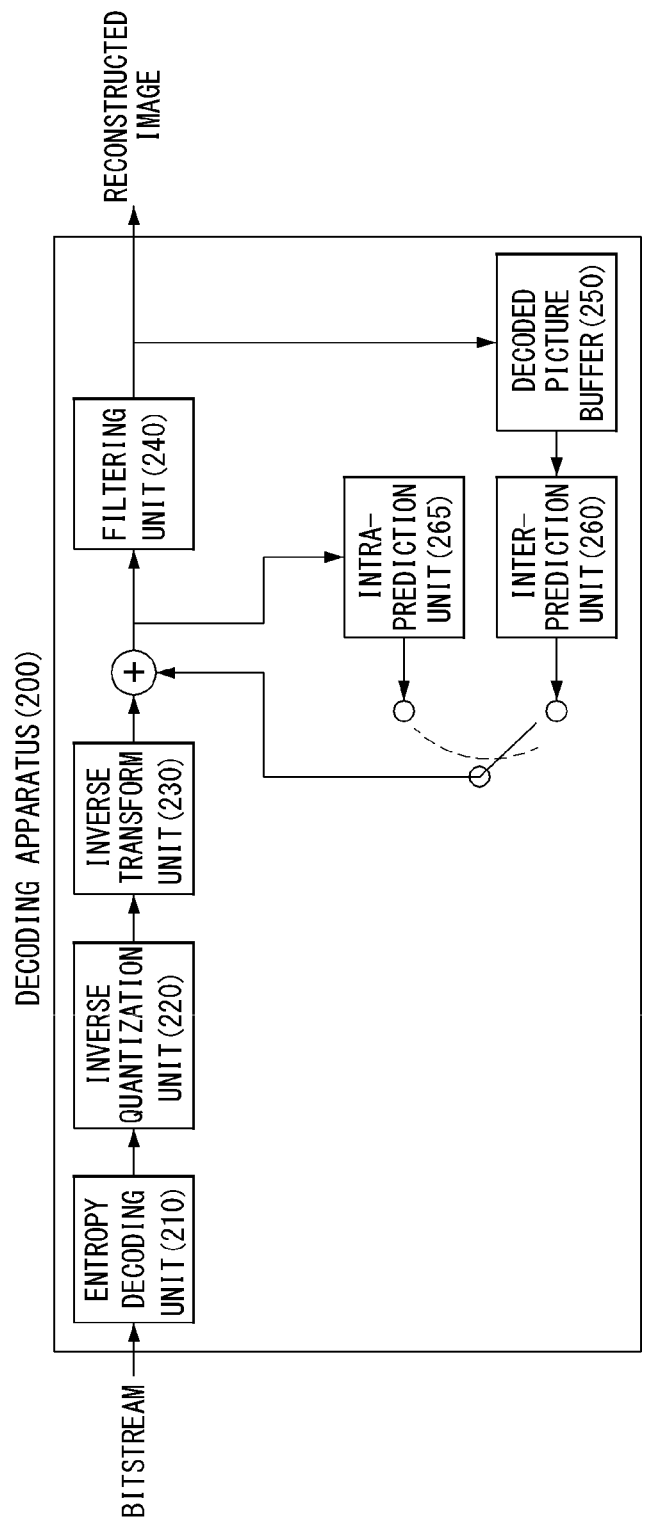

[Fig. 4]
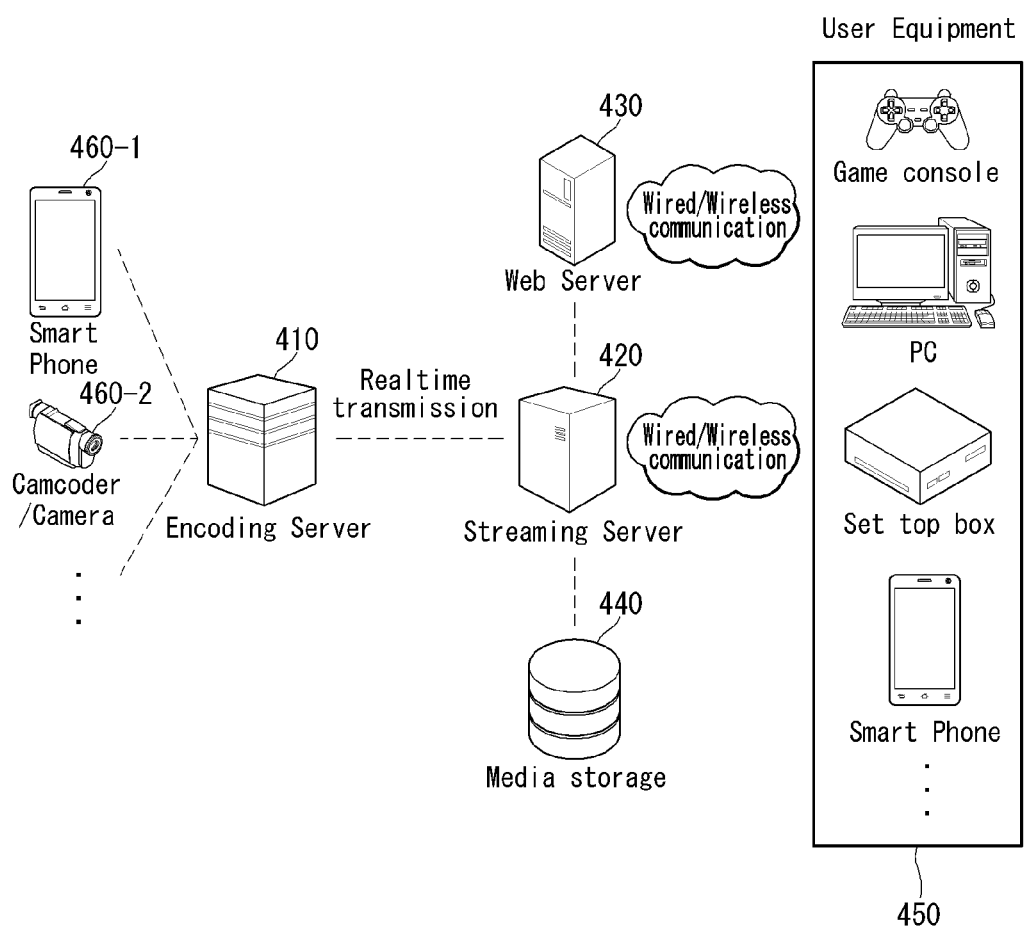

[Fig. 5]
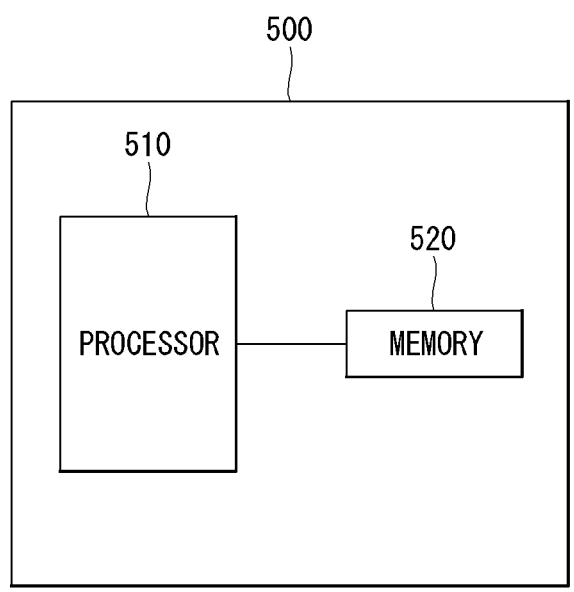
[Fig. 6A]
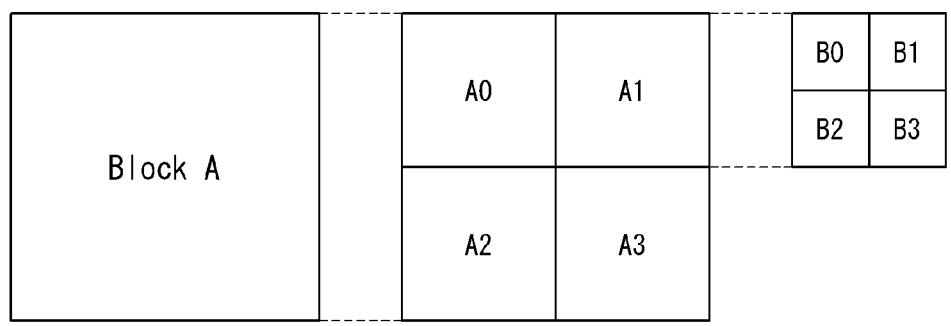

[Fig. 6B]
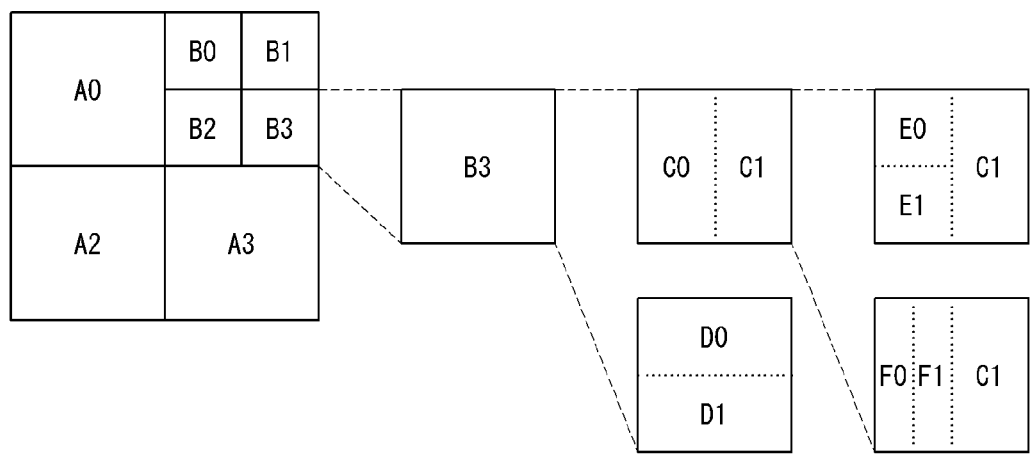
[Fig. 6C]
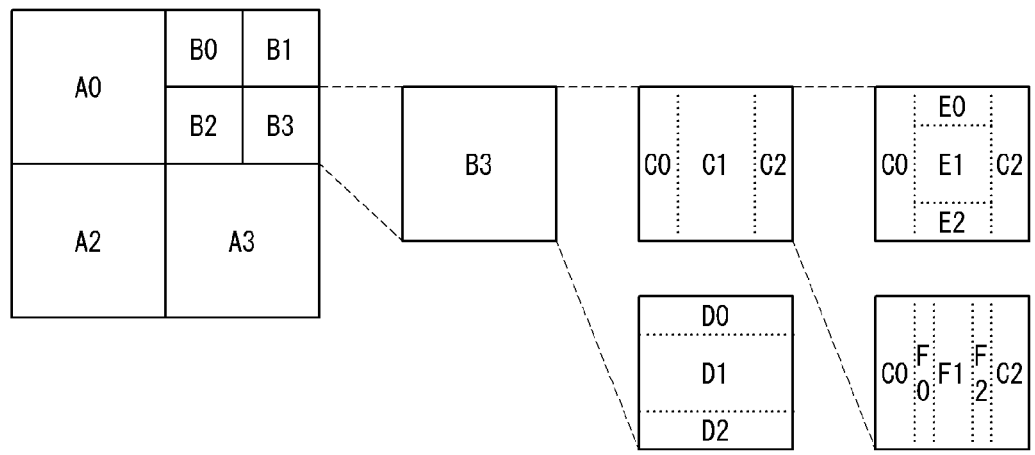

【Fig. 6D】
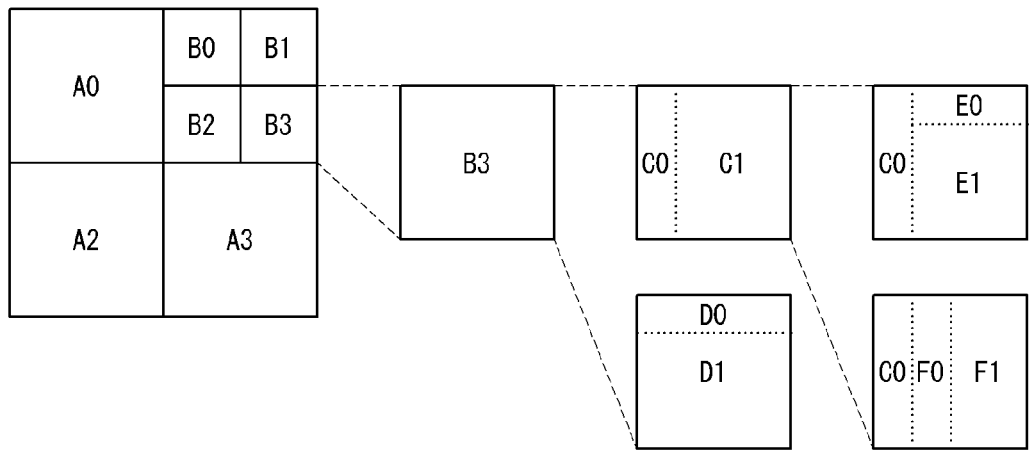
【Fig. 7】
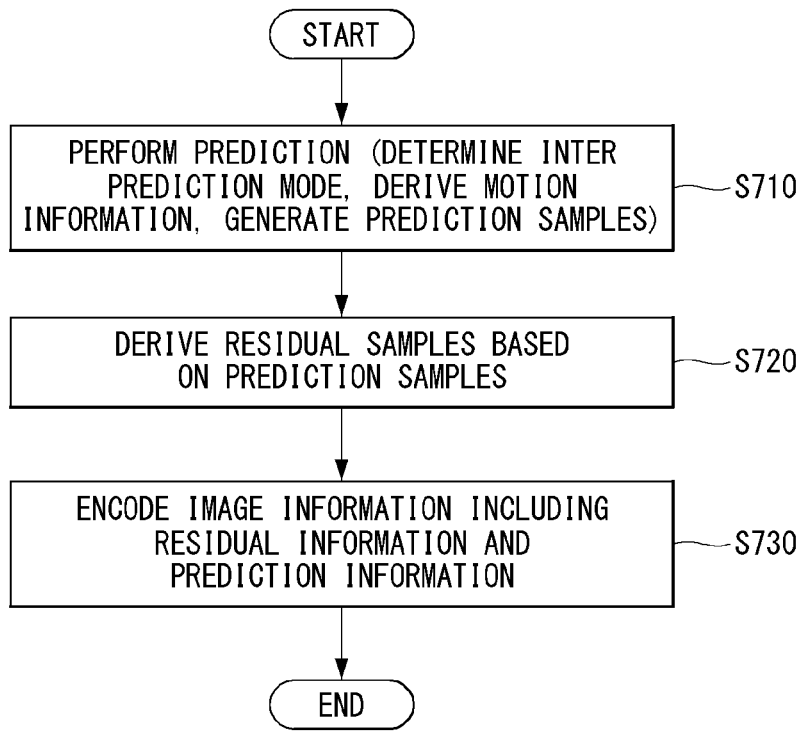

[Fig. 8]
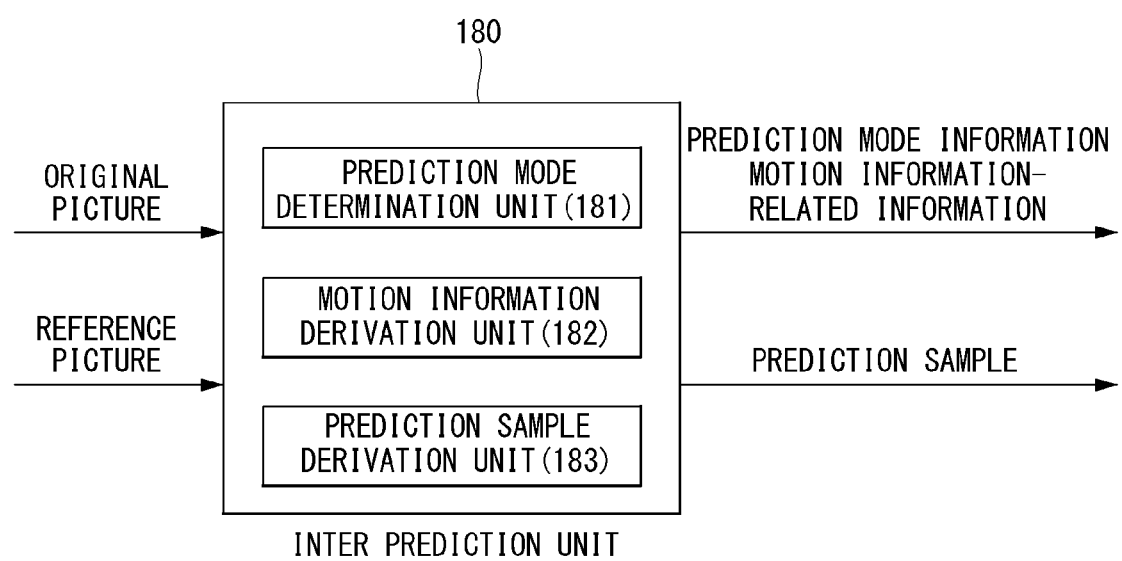

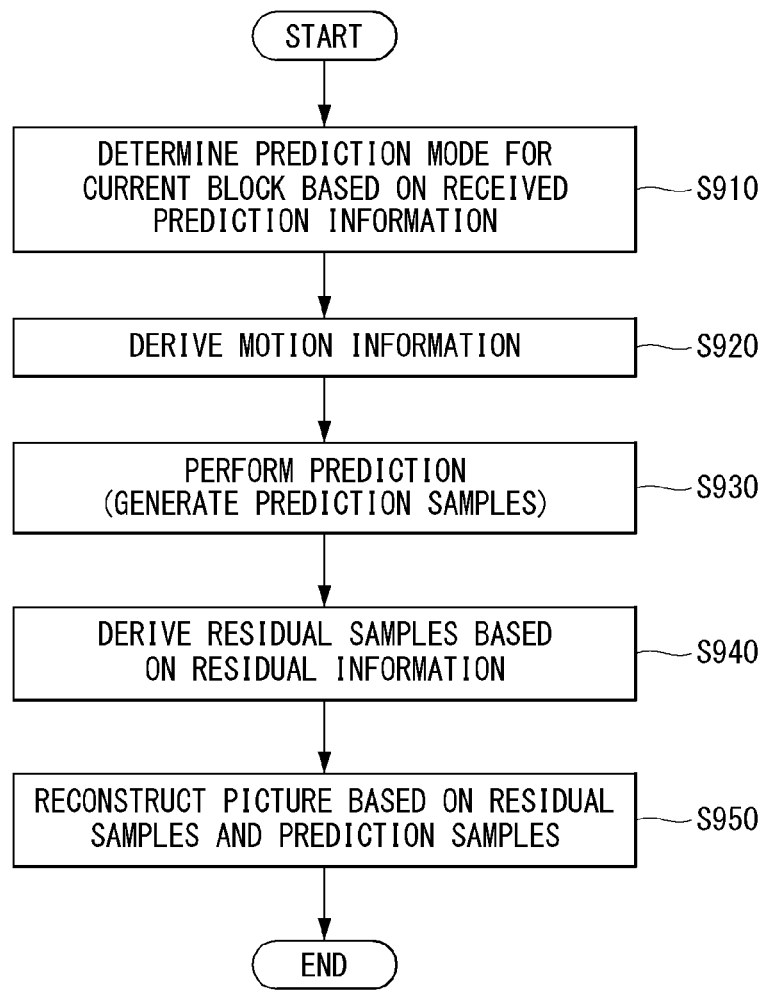
[Fig. 9]

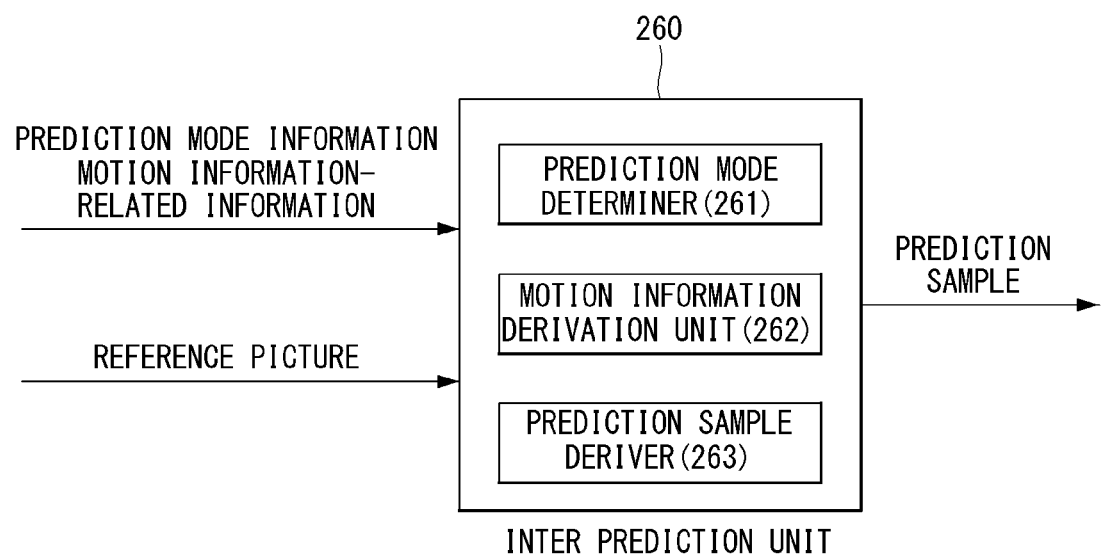
[Fig. 10]

[Fig. 11]
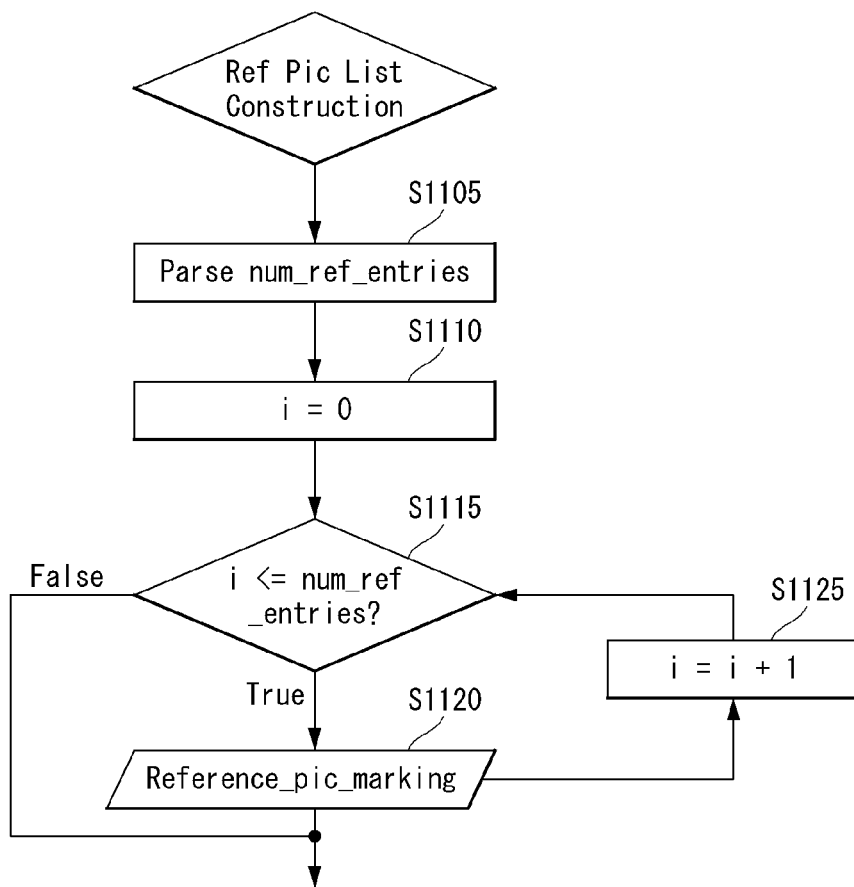

[Fig. 12]
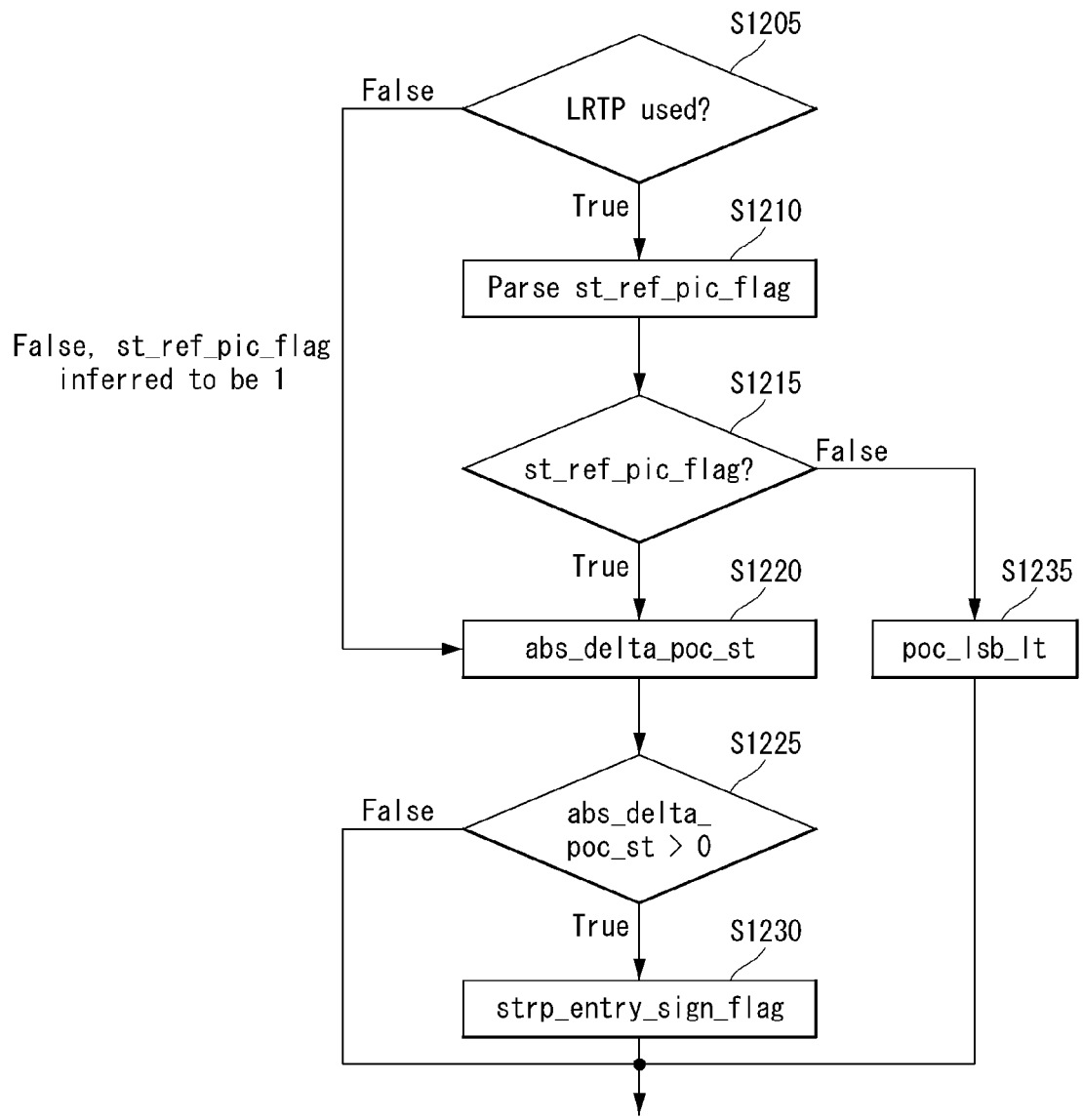
[Fig. 13]
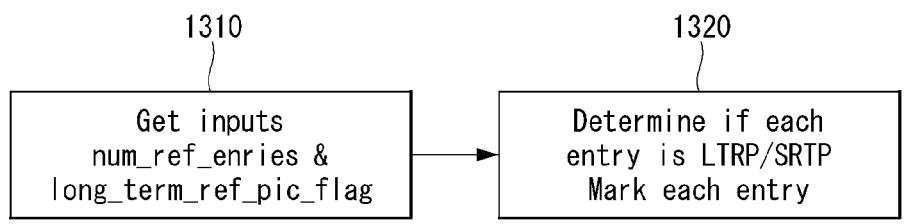

[Fig. 14]
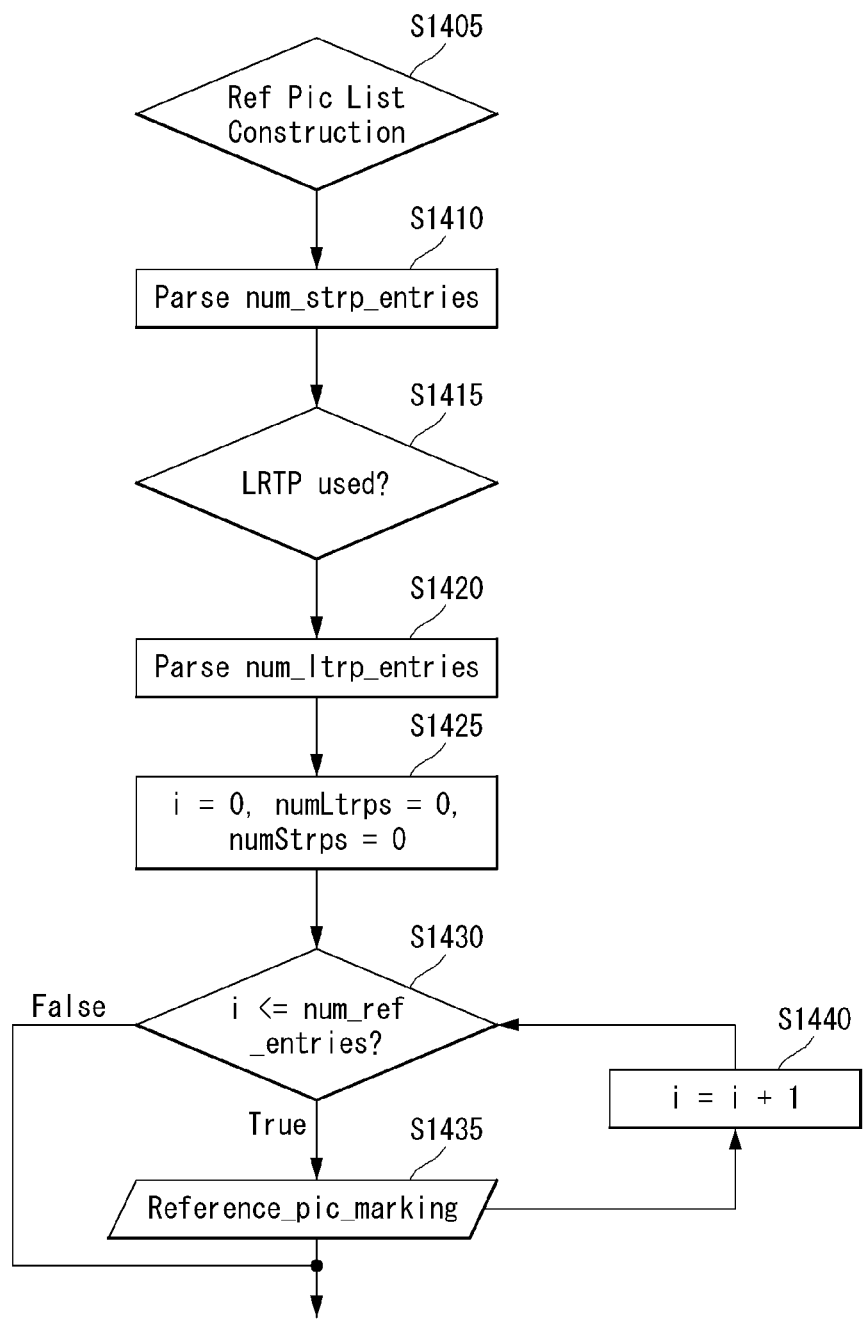

[Fig. 15]
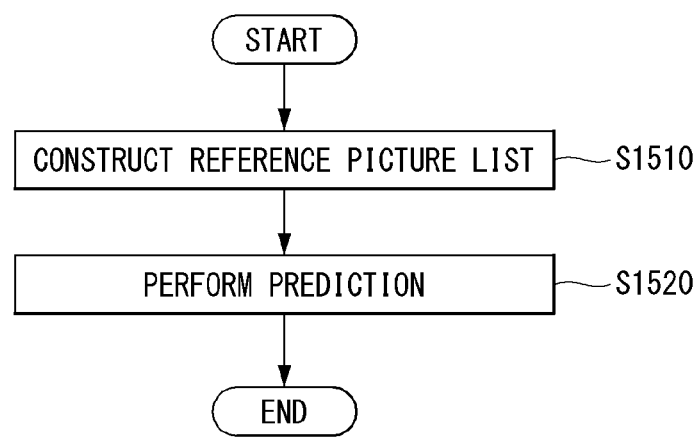

METHOD AND DEVICE FOR PROCESSING VIDEO SIGNAL BY USING INTER PREDICTION

CROSS-REFERENCE TO RELATED APPLICATIONS

This application is a continuation of U.S. application Ser. No. 16/942,040 filed on Jul. 29, 2020, which is a continuation of International Application No. PCT/KR2020/000032, filed on Jan. 2, 2020, which claims the benefit of U.S. Patent Application No. 62/787,384, filed on Jan. 2, 2019, the contents of which are all hereby incorporated by reference herein in their entirety.

TECHNICAL FIELD

Embodiments of the disclosure relate to methods and devices for processing video signals using inter prediction, and more specifically, to methods and devices for constructing a reference picture list for predicting the current picture.

BACKGROUND ART

Compression coding refers to technology for a series of signal processes for transmitting digitalized information via communication line or storing the same in a suitable format in a storage medium. Videos, images, voices, or other media may be targeted for compression coding. In particular, compression coding technology aimed at videos is known as video compression.

Next-generation video content will feature a high-spatial resolution, high-frame rate, and high dimensionality of scene representation. For processing of such content, an extensive increase will result in light of memory storage, memory access rate, and processing power.

Thus, a need exists for a design of coding tool for efficiently processing next-generation video content. In particular, post-high efficiency video coding (HEVC) video codec standards require prediction technology capable of precisely generating prediction samples while using resources more efficiently.

DETAILED DESCRIPTION OF THE DISCLOSURE

Technical Problem

Embodiments of the disclosure provide a method and device for constructing a reference picture list necessary for predicting the current picture.

Embodiments of the disclosure provide a method and device for obtaining information necessary for constructing a reference picture list.

Embodiments of the disclosure provide a method and device for defining the number of entries necessary for constructing a reference picture list.

Embodiments of the disclosure provide a method and device for reducing the amount of syntax elements necessary for constructing a reference picture list.

Embodiments of the disclosure provide a method and device for counting the number of times of reference picture marking during the course of constructing a reference picture list.

Objects of the disclosure are not limited to the foregoing, and other unmentioned objects would be apparent to one of ordinary skill in the art from the following description.

Technical Solution

Embodiments of the disclosure provide methods and devices for decoding video signals using inter prediction. According to an embodiment of the disclosure, a method for processing a video signal comprises constructing a reference picture list of a current picture in the video signal and performing a prediction for a current picture by using the reference picture list, wherein constructing the reference picture list comprising, if a first entry of the reference picture list corresponds to a short-term reference picture (STRP), obtaining a picture order count (POC) difference between a picture related to the first entry and another picture, and if a second entry of the reference picture list corresponds to a long-term reference picture (LTRP), obtaining a POC modulo value of a picture related to the second entry.

According to an embodiment, constructing the reference picture list may comprises obtaining a number of entries of the reference picture list and performing a reference picture marking for each of entries of the reference picture list as LTRP or STRP by the number of entries.

According to an embodiment, the number of entries may have the maximum value as the maximum required size of the decoded picture buffer plus 14.

According to an embodiment, performing the reference picture marking may comprise obtaining a number of STRP entries and LTRP entries and performing a STRP marking by the number of STRP entries, and performing a LTRP marking by the number of LTRP entries.

According to an embodiment, constructing the reference picture list may comprise obtaining a first flag and determining whether the entry of the reference picture list corresponds to the STRP entry or a LTRP entry based on the first flag.

According to an embodiment, the POC difference may be an absolute value of a POC of the another picture minus a POC of the picture related to the first entry.

According to an embodiment, constructing the reference picture list may comprise, if the absolute value is greater than 0, obtaining a second flag indicating a sign of the POC difference.

According to an embodiment of the disclosure, a method for encoding a video signal comprises constructing a reference picture list of a current picture in the video signal, performing a prediction for the current picture by using the reference picture list, and coding information for constructing the reference picture list. The information for constructing the reference picture list may include a picture order count (POC) difference between a picture related to a short-term reference picture (STRP) entry and another picture in the reference picture list and a POC modulo value of a picture in which a second entry relates to a long-term reference picture (LTRP) entry in the reference picture list.

According to an embodiment, coding information for constructing the reference picture list may further comprise a number of entries of the reference picture list. The number of entries may have the maximum value as the maximum required size of the decoded picture buffer plus 14.

According to an embodiment, the coding information for constructing the reference picture list may further comprise a first flag indicating whether an entry of the reference picture list corresponds to the STRP entry.

According to an embodiment, the coding information for constructing the reference picture list may further comprise a second flag indicating a sign of the POC difference for an entry of which the POC difference is greater than 0.

According to an embodiment, the coding information for constructing the reference picture list may be included in a sequence parameter set (SPS), picture parameter set (PPS), or slice header in a bitstream related to the video signal.

According to another embodiment of the disclosure, a device for decoding a video signal includes a memory for storing the video signal and a processor coupled with the memory. The processor is configured to construct a reference picture list of a current picture in the video signal and performs prediction on the current picture using the reference picture list. For constructing the reference picture list, the processor is configured to, if a first entry of the reference picture list corresponds to a short-term reference picture (STRP), obtain a picture order count (POC) difference between a picture related to the first entry and another picture and, if a second entry of the reference picture list corresponds to a long-term reference picture (LTRP), obtain a POC modulo value of a picture related to the second entry.

According to another embodiment of the disclosure, a device for encoding a video signal includes a memory for storing the video signal and a processor coupled with the memory. The processor is configured to construct a reference picture list of a current picture in the video signal and code information for constructing the reference picture list. The coding information for constructing the reference picture list may comprise a picture order count (POC) difference between a picture related to the first entry and another picture in the reference picture list, and a POC modulo of a picture related to the second entry in the reference picture list.

According to another embodiment of the disclosure, there is provided a non-transitory computer-readable medium storing one or more instructions. The one or more instructions executed by one or more processors control a video signal processing device to construct a reference picture list of a current picture in the video signal and perform prediction on the current picture using the reference picture list. The one or more instructions control the video signal processing device to, for constructing the reference picture list, if a first entry of the reference picture list corresponds to a short-term reference picture (STRP), obtain a picture order count (POC) difference between a picture related to the first entry and another picture and, if a second entry of the reference picture list corresponds to a long-term reference picture (LTRP), obtain a POC modulo value of a picture related to the second entry.

Advantageous Effects

According to an embodiment of the disclosure, a reference picture list necessary for predicting the current picture may be constructed by marking a reference picture.

According to an embodiment of the disclosure, proper information may be obtained per type of reference picture.

According to an embodiment of the disclosure, the number of entries necessary for constructing a reference picture list may be defined, enabling efficient management of the memory necessary for storing pictures.

According to an embodiment of the disclosure, the amount of data necessary for constructing a reference picture list may be omitting to parse some syntax elements.

According to an embodiment of the disclosure, a syntax for constructing a reference picture list may be efficiently implemented by counting the reference picture marking count.

Effects of the disclosure are not limited to the foregoing, and other unmentioned effects would be apparent to one of ordinary skill in the art from the following description.

BRIEF DESCRIPTION OF DRAWINGS

A more complete appreciation of the disclosure and many of the attendant aspects thereof will be readily obtained as the same becomes better understood by reference to the following detailed description when considered in connection with the accompanying drawings, wherein:

FIG. 1 illustrates an example video coding system according to an embodiment of the disclosure;

FIG. 2 is a block diagram schematically illustrating an encoding apparatus for encoding video/image signals according to an embodiment of the disclosure;

FIG. 3 is a block diagram schematically illustrating a decoding apparatus for decoding video signals according to an embodiment of the disclosure;

FIG. 4 is a view illustrating a structure of a content streaming system according to an embodiment of the disclosure;

FIG. 5 is a block diagram illustrating an example device for processing video signals according to an embodiment of the disclosure;

FIGS. 6A, 6B, 6C, and 6D are views illustrating example block split structures by quad tree (QT), binary tree (BT), ternary tree (TT), and asymmetric tree (AT), respectively, according to an embodiment of the disclosure;

FIGS. 7 and 8 illustrate an inter prediction-based video/image encoding procedure and an inter predicting unit in an encoding apparatus according to an embodiment of the disclosure;

FIGS. 9 and 10 illustrate an inter prediction-based video/image decoding procedure and an inter predicting unit in a decoding apparatus according to an embodiment of the disclosure;

FIG. 11 is a flowchart illustrating an example of constructing a reference picture list according to an embodiment of the disclosure;

FIGS. 12 and 13 are flowcharts illustrating an example of marking reference pictures according to an embodiment of the disclosure;

FIG. 14 is a flowchart illustrating another example of marking reference pictures according to an embodiment of the disclosure; and FIG. 15 is a flowchart illustrating an example of processing video signals according to an embodiment of the disclosure.

MODE FOR PRACTICING THE DISCLOSURE

Hereinafter, preferred embodiments of the disclosure are described in detail with reference to the accompanying drawings. The following detailed description taken in conjunction with the accompanying drawings is intended for describing example embodiments of the disclosure, but not for representing a sole embodiment of the disclosure. The detailed description below includes specific details to convey a thorough understanding of the disclosure. However, it will be easily appreciated by one of ordinary skill in the art that embodiments of the disclosure may be practiced even without such details.

In some cases, to avoid ambiguity in concept, known structures or devices may be omitted or be shown in block diagrams while focusing on core features of each structure and device.

Although embodiments of the disclosure are described mostly with general terms currently in wide use, some specific terms may be chosen by the inventors. In such a case, the inventors' definitions may be given for the terms. Thus, the terms used herein should be interpreted in light of their definitions made by the inventors, rather than their simple dictionary definitions.

The terminology used herein is provided for a better understanding of the disclosure, and changes may be made thereto without departing from the technical spirit of the disclosure. For example, the terms "signal," "data," "sample," "picture," "slice," "tile," "frame," and "block" may be properly replaced and interpreted in each coding process.

As used herein, the term "processing unit" means a unit of processing, such as encoding/decoding, e.g., prediction, transform, and/or quantization. "Processing unit" may be interpreted as encompassing a unit for the luma component and a unit for chroma component. For example, the processing unit may correspond to a block, coding unit (CU), prediction unit (PU), or transform unit (TU).

The processing unit may also be interpreted as a unit for the luma component or a unit for the chroma component. For example, the processing unit may correspond to a coding tree block, coding block (CB), PU, or transform block (TB) for the luma component. Or, the processing unit may correspond to a CTB, CB, PU, or TB for the chroma component. Without limitations thereto, however, the processing unit may also be interpreted as including a unit for the luma component and a unit for the chroma component.

Further, the processing unit is not necessarily limited to square blocks but may rather be a polygon with three or more vertexes.

As used herein, "pixel" and "coefficient" (e.g., a transform coefficient or a transform coefficient that has undergone first transform) may be collectively referred to as a sample. When a sample is used, this may mean that, e.g., a pixel value or coefficient (e.g., a transform coefficient or a transform coefficient that has undergone first transform) is used.

FIG. 1 illustrates an example video coding system according to an embodiment of the disclosure.

The video coding system may include a source device 10 and a receive device 20. The source device 10 may transfer encoded video/image information or data in a file or streaming form to the receive device 20 via a digital storage medium or network.

The source device 10 may include a video source 11, an encoding apparatus 12, and a transmitter 13. The receive device 20 may include a receiver 21, a decoding apparatus 22, and a renderer 23. The encoding apparatus 12 may be referred to as a video/image encoding apparatus, and the decoding apparatus 22 may be referred to as a video/image decoding apparatus. The transmitter 13 may be included in the encoding apparatus 12. The receiver 21 may be included in the decoding apparatus 22. The renderer 23 may include a display unit, and the display unit may be configured as a separate device or external component.

The video source may obtain a video/image by capturing, synthesizing, or generating the video/image. The video source may include a video/image capturing device and/or a video/image generating device. The video/image capturing device may include, e.g., one or more cameras and a video/image archive including previously captured videos/images. The video/image generating device may include, e.g., a computer, tablet PC, or smartphone, and may (electronically) generate videos/images. For example, a virtual video/image may be generated via, e.g., a computer, in which case a process for generating its related data may replace the video/image capturing process.

The encoding apparatus 12 may encode the input video/image. The encoding apparatus 12 may perform a series of processes, such as prediction, transform, and quantization, for compression and coding efficiency. The encoded data (encoded video/image information) may be output in the form of a bitstream.

The transmitter 13 may transfer the encoded video/image information or data, which has been output in the bitstream form, in a file or streaming form to the receiver of the receive device via a digital storage medium or network. The digital storage medium may include various storage media, such as universal serial bus (USB), secure digital (SD), compact disc (CD), digital video disc (DVD), Blu-ray, hard disk drive, or solid state drive (SSD) media. The transmitter 13 may include an element for generating media files in a predetermined file format and an element for transmission over a broadcast/communications network. The receiver 21 may extract the bitstream and transfer the bitstream to the decoding apparatus 22.

The decoding apparatus 22 may perform a series of procedures, such as inverse quantization, inverse transform, and prediction, corresponding to the operations of the encoding apparatus 12, decoding the video/image.

The renderer 23 may render the decoded video/image. The rendered video/image may be displayed on the display unit.

FIG. 2 is a block diagram schematically illustrating an encoding apparatus for encoding video/image signals according to an embodiment of the disclosure.

Referring to FIG. 2, an encoding apparatus 100 may include an image partitioning unit 110, a subtractor 115, a transform unit 120, a quantization unit 130, an inverse quantization unit 140, an inverse transform unit 150, an adder 155, a filtering unit 160, a memory 170, an inter prediction unit 180, an intra prediction unit 185, and an entropy encoding unit 190. The inter prediction unit 180 and the intra prediction unit 185 may be collectively referred to as a predictor. In other words, the predictor may include the inter prediction unit 180 and the intra prediction unit 185. The transform unit 120, the quantization unit 130, the inverse quantization unit 140, and the inverse transform unit 150 may be included in a residual processor. The residual processor may further include the subtractor 115. The above-described image partitioning unit 110, subtractor 115, transform unit 120, quantization unit 130, inverse quantization unit 140, inverse transform unit 150, adder 155, filtering unit 160, inter prediction unit 180, intra prediction unit 185, and entropy encoding unit 190 may be configured as a single hardware component (e.g., an encoder or processor) according to an embodiment. According to an embodiment, the memory 170 may be configured as a single hardware component (e.g., a memory or digital storage medium), and the memory 170 may include a decoded picture buffer (DPB) 175.

The image partitioning unit 110 may split the image (or picture or frame) input to the encoding apparatus 100 into one or more processing units. As an example, the processing unit may be referred to as a coding unit (CU). In this case, the coding unit may be recursively split into from a coding tree unit (CTU) or largest coding unit (LCU), according to a quad-tree binary-tree (QTBT) structure. For example, one coding unit may be split into a plurality of coding units of a deeper depth based on the quad tree structure and/or binary tree structure. In this case, for example, the quad tree structure may be applied first, and the binary tree structure may then be applied. Or the binary tree structure may be applied first. A coding procedure according to an embodiment of the disclosure may be performed based on the final coding unit that is not any longer split. In this case, the largest coding unit may immediately be used as the final coding unit based on, e.g., coding efficiency per image properties or, as necessary, the coding unit may be recursively split into coding units of a lower depth, and the coding unit of the optimal size may be used as the final coding unit. The coding procedure may include, e.g., prediction, transform, or reconstruction described below. As an example, the processing unit may further include the prediction unit PU or transform unit TU. In this case, the prediction unit and transform unit each may be split into or partitioned from the above-described final coding unit. The prediction unit may be a unit of sample prediction, and the transform unit may be a unit for deriving the transform coefficient and/or a unit for deriving the residual signal from the transform coefficient.

The term "unit" may be interchangeably used with "block" or "area" in some cases. Generally, M×N block may denote a set of samples or transform coefficients consisting of M columns and N rows. Generally, sample may denote the pixel or pixel value or may denote the pixel/pixel value of only the luma component or the pixel/pixel value of only the chroma component. Sample may be used as a term corresponding to the pixel or pel of one picture (or image).

The encoding apparatus 100 may generate a residual signal (residual block or residual sample array) by subtracting the prediction signal (predicted block or prediction sample array) output from the inter prediction unit 180 or intra prediction unit 185 from the input image signal (raw block or raw sample array), and the generated residual signal is transmitted to the transform unit 120. In this case, as shown, the unit for subtracting the prediction signal (prediction block or prediction sample array) from the input image signal (raw block or raw sample array) in the encoding apparatus 100 may be referred to as the subtractor 115. The predictor may perform prediction on the target block for processing (hereinafter, current block) and generate a predicted block including prediction samples for the current block. The predictor may determine whether intra prediction or inter prediction is applied in each block or CU unit. The predictor may generate various pieces of information for prediction, such as prediction mode information, as described below in connection with each prediction mode, and transfer the generated information to the entropy encoding unit 190. The prediction-related information may be encoded by the entropy encoding unit 190 and be output in the form of a bitstream.

The intra prediction unit 185 may predict the current block by referencing the samples in the current picture. The referenced samples may neighbor, or be positioned away from, the current block depending on the prediction mode. In the intra prediction, the prediction modes may include a plurality of non-directional modes and a plurality of directional modes. The non-directional modes may include, e.g., a DC mode and a planar mode. The directional modes may include, e.g., 33 directional prediction modes or 65 directional prediction modes depending on how elaborate the prediction direction is. However, this is merely an example, and more or less directional prediction modes may be used. The intra prediction unit 185 may determine the prediction mode applied to the current block using the prediction mode applied to the neighboring block.

The inter prediction unit 180 may derive a predicted block for the current block, based on a reference block (reference sample array) specified by a motion vector on the reference picture. Here, to reduce the amount of motion information transmitted in the inter prediction mode, the motion information may be predicted per block, subblock, or sample based on the correlation in motion information between the neighboring block and the current block. The motion information may include the motion vector and a reference picture index. The motion information may further include inter prediction direction (L0 prediction, L1 prediction, or Bi prediction) information. In the case of inter prediction, neighboring blocks may include a spatial neighboring block present in the current picture and a temporal neighboring block present in the reference picture. The reference picture including the reference block may be identical to, or different from, the reference picture including the temporally neighboring block. The temporally neighboring block may be termed, e.g., co-located reference block or co-located CU (colCU), and the reference picture including the temporally neighboring block may be termed a co-located picture (colPic). For example, the inter prediction unit 180 may construct a motion information candidate list based on neighboring blocks and generate information indicating what candidate is used to derive the motion vector and/or reference picture index of the current block. Inter prediction may be performed based on various prediction modes. For example, in skip mode or merge mode, the inter prediction unit 180 may use the motion information for the neighboring block as motion information for the current block. In skip mode, unlike in merge mode, no residual signal may be transmitted. In motion vector prediction (MVP) mode, the motion vector of the neighboring block may be used as a motion vector predictor, and a motion vector difference may be signaled, thereby indicating the motion vector of the current block.

The prediction signal generated via the inter prediction unit 180 or intra prediction unit 185 may be used to generate a reconstructed signal or a residual signal.

The transform unit 120 may apply a transform scheme to the residual signal, generating transform coefficients. For example, the transform scheme may include at least one of a discrete cosine transform (DCT), discrete sine transform (DST), Karhunen-Loeve transform (KLT), graph-based transform (GBT), or conditionally non-linear transform (CNT). The GBT means a transform obtained from a graph in which information for the relationship between pixels is represented. The CNT means a transform that is obtained based on generating a prediction signal using all previously reconstructed pixels. Further, the transform process may apply to squared pixel blocks with the same size or may also apply to non-squared, variable-size blocks.

The quantization unit 130 may quantize transform coefficients and transmit the quantized transform coefficients to the entropy encoding unit 190, and the entropy encoding unit 190 may encode the quantized signal (information for the quantized transform coefficients) and output the encoded signal in a bitstream. The information for the quantized transform coefficients may be referred to as residual information. The quantization unit 130 may re-sort the block-shaped quantized transform coefficients in the form of a one-dimension vector, based on a coefficient scan order and generate the information for the quantized transform coefficients based on the one-dimensional form of quantized transform coefficients. The entropy encoding unit 190 may perform various encoding methods, such as, e.g., exponential Golomb, context-adaptive variable length coding (CAVLC), or context-adaptive binary arithmetic coding (CABAC). The entropy encoding unit 190 may encode the values of pieces of information (e.g., syntax elements) necessary to reconstruct the video/image, along with or separately from the quantized transform coefficients. The encoded information (e.g., video/image information) may be transmitted or stored in the form of a bitstream, on a per-network abstraction layer (NAL) unit basis. The bitstream may be transmitted via the network or be stored in the digital storage medium. The network may include, e.g., a broadcast network and/or communication network, and the digital storage medium may include, e.g., USB, SD, CD, DVD, Blu-ray, HDD, SSD, or other various storage media. A transmitter (not shown) for transmitting, and/or a storage unit (not shown) storing, the signal output from the entropy encoding unit 190 may be configured as an internal/external element of the encoding apparatus 100, or the transmitter may be a component of the entropy encoding unit 190.

The quantized transform coefficients output from the quantization unit 130 may be used to generate the prediction signal. For example, the residual signal may be reconstructed by applying inverse quantization and inverse transform on the quantized transform coefficients via the inverse quantization unit 140 and inverse transform unit 150 in the loop. The adder 155 may add the reconstructed residual signal to the prediction signal output from the inter prediction unit 180 or intra prediction unit 185, thereby generating the reconstructed signal (reconstructed picture, reconstructed block, or reconstructed sample array). As in the case where skip mode is applied, when there is no residual for the target block for processing, the predicted block may be used as the reconstructed block. The adder 155 may be denoted a reconstructor or reconstructed block generator. The reconstructed signal may be used for intra prediction of the next target processing block in the current picture and, as described below, be filtered and then used for inter prediction of the next picture.

The filtering unit 160 may enhance the subjective/objective image quality by applying filtering to the reconstructed signal. For example, the filtering unit 160 may generate a modified reconstructed picture by applying various filtering methods to the reconstructed picture and transmit the modified reconstructed picture to the decoding picture buffer 170. The various filtering methods may include, e.g., deblocking filtering, sample adaptive offset, adaptive loop filter, or bilateral filter. The filtering unit 160 may generate various pieces of information for filtering and transfer the resultant information to the entropy encoding unit 190 as described below in connection with each filtering method. The filtering-related information may be encoded by the entropy encoding unit 190 and be output in the form of a bitstream.

The modified reconstructed picture transmitted to the decoding picture buffer 170 may be used as the reference picture in the inter prediction unit 180. The encoding apparatus 100, when inter prediction is applied thereby, may avoid a prediction mismatch between the encoding apparatus 100 and the decoding apparatus 200 and enhance coding efficiency.

The decoding picture buffer 170 may store the modified reconstructed picture for use as the reference picture in the inter prediction unit 180.

FIG. 3 is a block diagram schematically illustrating a decoding apparatus for decoding video signals according to an embodiment of the disclosure.

Referring to FIG. 3, a decoding apparatus 200 may include an entropy decoding unit 210, an inverse quantization unit 220, an inverse transform unit 230, an adder 235, a filtering unit 240, a memory 250, an inter prediction unit 260, and an intra prediction unit 265. The inter prediction unit 260 and the intra prediction unit 265 may be collectively referred to as a predictor. In other words, the predictor may include the inter prediction unit 180 and the intra prediction unit 185. The inverse quantization unit 220 and the inverse transform unit 230 may be collectively referred to as a residual processor. In other words, the residual processor may include the inverse quantization unit 220 and the inverse transform unit 230. The entropy decoding unit 210, the inverse quantization unit 220, the inverse transform unit 230, the adder 235, the filtering unit 240, the inter prediction unit 260, and the intra prediction unit 265 may be configured in a single hardware component (e.g., a decoder or processor) according to an embodiment. The decoding picture buffer 250 may be implemented as a single hardware component (e.g., a memory or digital storage medium) according to an embodiment. The memory 250 may include the DPB 175 and be configured of the digital storage medium.

When a bitstream including video/image information is input, the decoding apparatus 200 may reconstruct the image corresponding to the video/image information process in the encoding apparatus 100 of FIG. 2. For example, the decoding apparatus 200 may perform decoding using the processing unit applied in the encoding apparatus 100. Thus, upon decoding, the processing unit may be, e.g., a coding unit, and the coding unit may be split from the coding tree unit or largest coding unit, according to the quad tree structure and/or binary tree structure. The reconstructed image signal decoded and output through the decoding apparatus 200 may be played via a player.

The decoding apparatus 200 may receive the signal output from the encoding apparatus 100 of FIG. 2, in the form of a bitstream, and the received signal may be decoded via the entropy decoding unit 210. For example, the entropy decoding unit 210 may parse the bitstream and extract information (e.g., video/image information) necessary for image reconstruction (or picture reconstruction). For example, the entropy decoding unit 210 may decode the information in the bitstream based on a coding method, such as exponential Golomb encoding, CAVLC, or CABAC and may output the values of syntax elements necessary for image reconstruction and quantized values of transform coefficients regarding the residual. Specifically, the CABAC entropy decoding method may receive a bin corresponding to each syntax element in the bitstream, determine a context model using decoding target syntax element information, decoding information for neighboring and decoding target block, or information for the symbol/bin decoded in the prior step, predict the probability of occurrence of a bin according to the determined context model, and performing the arithmetic decoding of the bin. At this time, after determining the context model, the CABAC entropy decoding method may update the context model using information for the symbol/bin decoded for the context model of the next symbol/bin. Among the pieces of information decoded by the entropy decoding unit 210, information for prediction may be provided to the predictor (e.g., the inter prediction unit 260 and intra prediction unit 265), and the residual value entropy-decoded by the entropy decoding unit 210, i.e., the quantized transform coefficients and relevant processor information, may be input to the inverse quantization unit 220. Among the pieces of information decoded by the entropy decoding unit 210, information for filtering may be provided to the filtering unit 240. Meanwhile, a receiver (not shown) for receiving the signal output from the encoding apparatus 100 may further be configured as an internal/external element of the decoding apparatus 200, or the receiver may be a component of the entropy decoding unit 210.

The inverse quantization unit 220 may inverse-quantize the quantized transform coefficients and output the transform coefficients. The inverse quantization unit 220 may re-sort the quantized transform coefficients in the form of a two-dimensional block. In this case, the re-sorting may be performed based on the coefficient scan order in which the encoding apparatus 100 has performed. The inverse quantization unit 220 may inverse-quantize the quantized transform coefficients using quantization parameters (e.g., quantization step size information), obtaining transform coefficients.

The inverse transform unit 230 may output the residual signal (residual block or residual sample array) by applying an inverse-transform on the transform coefficients.

The predictor may perform prediction on the current block and generate a predicted block including prediction samples for the current block. The predictor may determine which one of intra prediction or inter prediction is applied to the current block based on information for prediction output from the entropy decoding unit 210 and determine a specific intra/inter prediction mode.

The intra prediction unit 265 may predict the current block by referencing the samples in the current picture. The referenced samples may neighbor, or be positioned away from, the current block depending on the prediction mode. In the intra prediction, the prediction modes may include a plurality of non-directional modes and a plurality of directional modes. The intra prediction unit 265 may determine the prediction mode applied to the current block using the prediction mode applied to the neighboring block.

The inter prediction unit 260 may derive a predicted block for the current block, based on a reference block (reference sample array) specified by a motion vector on the reference picture. Here, to reduce the amount of motion information transmitted in the inter prediction mode, the motion information may be predicted per block, subblock, or sample based on the correlation in motion information between the neighbor block and the current block. The motion information may include the motion vector and a reference picture index. The motion information may further include information for inter prediction direction (L0 prediction, L1 prediction, or Bi prediction). In the case of inter prediction, neighboring blocks may include a spatial neighboring block present in the current picture and a temporal neighboring block present in the reference picture. For example, the inter prediction unit 260 may construct a motion information candidate list based on the neighboring blocks and derive the motion vector and/or reference picture index of the current block based on the received candidate selection information. Inter prediction may be performed based on various prediction modes. The information for prediction may include information indicating the mode of inter prediction for the current block.

The adder 235 may add the obtained residual signal to the prediction signal (e.g., predicted block or prediction sample array) output from the inter prediction unit 260 or intra prediction unit 265, thereby generating the reconstructed signal (reconstructed picture, reconstructed block, or reconstructed sample array). As in the case where skip mode is applied, when there is no residual for the target block for processing, the predicted block may be used as the reconstructed block.

The adder 235 may be denoted a reconstructor or reconstructed block generator. The generated reconstructed signal may be used for intra prediction of the next target processing block in the current picture and, as described below, be filtered and then used for inter prediction of the next picture.

The filtering unit 240 may enhance the subjective/objective image quality by applying filtering to the reconstructed signal. For example, the filtering unit 240 may generate a modified reconstructed picture by applying various filtering methods to the reconstructed picture and transmit the modified reconstructed picture to the decoding picture buffer 250. The various filtering methods may include, e.g., deblocking filtering, sample adaptive offset (SAO), adaptive loop filter (ALF), or bilateral filter.

The modified reconstructed picture transmitted to the decoding picture buffer 250 may be used as the reference picture by the inter prediction unit 260.

In the disclosure, the embodiments described above in connection with the filtering unit 160, the inter prediction unit 180, and the intra prediction unit 185 of the encoding apparatus 100 may be applied, in the same way as, or to correspond to, the filtering unit 240, the inter prediction unit 260, and the intra prediction unit 265 of the decoding apparatus.

FIG. 4 is a view illustrating a structure of a content streaming system according to an embodiment of the disclosure.

The content streaming system to which the disclosure is applied may largely include an encoding server 410, an, a web server 430, media storage 440, a user device 450, and a multimedia input device 460.

The encoding server 410 may compress content input from multimedia input devices, such as smartphones, cameras, or camcorders, into digital data, generate a bitstream, and transmit the bitstream to the streaming server 420. As an example, when the multimedia input devices 460, such as smartphones, cameras, or camcorders, themselves generate a bitstream, the encoding server 410 may be omitted.

The bitstream may be generated by an encoding or bitstream generation method to which the disclosure is applied, and the streaming server 420 may temporarily store the bitstream while transmitting or receiving the bitstream.

The streaming server 420 may transmit multimedia data to the user device 450 based on a user request through the web server 430, and the web server 430 plays a role as an agent to notify the user what services are provided. When the user sends a request for a desired service to the web server 430, the web server 430 transfers the request to the streaming server 420, and the streaming server 420 transmits multimedia data to the user. The content streaming system may include a separate control server in which case the control server controls commands/responses between the devices in the content streaming system.

The streaming server 420 may receive content from the media storage 440 and/or the encoding server 410. For example, the streaming server 420 may receive, in real-time, content from the encoding server 410. In this case, to seamlessly provide the service, the streaming server 420 may store the bitstream for a predetermined time.

For example, examples of the user device 450 may include mobile phones, smart phones, laptop computers, digital broadcast terminals, personal digital assistants (PDAs), portable multimedia players (PMPs), navigation devices, slate PCs, tablet PCs, ultrabooks, wearable devices, such as smartwatches, smart glasses, or head mounted displays (HMDs), digital TVs, desktop computers, or digital signage devices.

In the content streaming system, the servers may be distributed servers in which case data received by each server may be distributed and processed.

FIG. 5 is a block diagram illustrating an example device for processing video signals according to an embodiment of the disclosure. The video signal processing device of FIG. 5 may correspond to the encoding apparatus 100 of FIG. 2 or the decoding apparatus 200 of FIG. 3.

According to an embodiment of the disclosure, the video signal processing device 500 may include a memory 520 for storing video signals and a processor 510 coupled with the memory to process video signals.

According to an embodiment of the disclosure, the processor 510 may be configured as at least one processing circuit for processing video signals and may execute instructions for encoding or decoding video signals to thereby process video signals. In other words, the processor 510 may encode video signals or decode encoded video signals by executing encoding or decoding methods described below.

According to an embodiment of the disclosure, the processor 510 may be configured as at least one processing circuit for processing image signals and may execute instructions for encoding or decoding image signals to thereby process image signals. In other words, the processor 510 may encode raw image data or decode encoded image signals by executing encoding or decoding methods described above.

FIGS. 6A, 6B, 6C, and 6D are views illustrating example block split structures by quad tree (QT), binary tree (BT), ternary tree (TT), and asymmetric tree (AT), respectively, according to an embodiment of the disclosure.

In video coding, one block may be split based on the QT. One subblock split into by the QT may further be split recursively by the QT. The leaf block which is not any longer split by the QT may be split by at least one scheme of the BT, TT, or AT. The BT may have two types of splitting, such as horizontal BT (2N×N, 2N×N) and vertical BT (N×2N, N×2N). The TT may have two types of splitting, such as horizontal TT (2N×½N, 2N×N, 2N×½N) and vertical TT (½N×2N, N×2N, ½N×2N). The AT may have four types of splitting, such as horizontal-up AT (2N×½N, 2N×3/2N), horizontal-down AT (2N×3/2N, 2N×½N), vertical-left AT (½N×2N, 3/2N×2N), and vertical-right AT (3/2N×2N, ½N×2N). The BT, TT, and AT each may be further split recursively using the BT, TT, and AT.

FIG. 6A shows an example of QT splitting. Block A may be split into four subblocks (A0, A1, A2, A3) by the QT. Subblock A1 may be split again into four subblocks (B0, B1, B2, B3) by the QT.

FIG. 6B shows an example of BT splitting. Block B3, which is not any longer split by the QT, may be split into vertical BT (C0, 01) or horizontal BT (D0, D1). Like block C0, each subblock may be further split recursively, e.g., in the form of horizontal BT (E0, E1) or vertical BT (F0, F1).

FIG. 6C shows an example of TT splitting. Block B3, which is not any longer split by the QT, may be split into vertical TT (C0, C1, C2) or horizontal TT (D0, D1, D2). Like block C1, each subblock may be further split recursively, e.g., in the form of horizontal TT (E0, E1, E2) or vertical TT (F0, F1, F2).

FIG. 6D shows an example of AT splitting. Block B3, which is not any longer split by the QT, may be split into vertical AT (C0, C1) or horizontal AT (D0, D1). Like block C1, each subblock may be further split recursively, e.g., in the form of horizontal AT (E0, E1) or vertical TT (F0, F1).

Meanwhile, the BT, TT, and AT may be used together for splitting. For example, the subblock split by the BT may be split by the TT or AT. Further, the subblock split by the TT may be split by the BT or AT. The subblock split by the AT may be split by the BT or TT. For example, after split by the horizontal BT, each subblock may be split by the vertical BT or, after split by the vertical BT, each subblock may be split by the horizontal BT. In this case, although different splitting orders are applied, the final shape after split may be identical.

When a block is split, various orders of searching for the block may be defined. Generally, a search is performed from the left to right or from the top to bottom. Searching for a block may mean the order of determining whether to further split each subblock split into or, if the block is not split any longer, the order of encoding each subblock, or the order of search when the subblock references other neighboring block.

FIGS. 7 and 8 illustrate an inter prediction-based video/image encoding procedure and an inter predicting unit in an encoding apparatus according to an embodiment of the disclosure.

The encoding apparatus 100 performs inter prediction on the current block (S710). The encoding apparatus 100 may derive the motion i and inter prediction mode of the current block and generate prediction samples of the current block. Here, the determining of the inter prediction mode, deriving of the motion information, and generating of the prediction samples may be performed simultaneously, or any one may be performed earlier than the others. For example, the inter prediction unit 180 of the encoding apparatus 100 may include a prediction mode determination unit 181, a motion information derivation unit 182, and a prediction sample derivation unit 183. The prediction mode determination unit 181 may determine the prediction mode for the current block, the motion information derivation unit 182 may derive the motion information for the current block, and the prediction sample derivation unit 183 may derive the prediction samples of the current block. For example, the inter prediction unit 180 of the encoding apparatus 100 may search for a block similar to the current block in a predetermined area (search area) of reference pictures via motion estimation and derive a reference block with the minimum difference or a predetermined difference or less from the current block. Based thereupon, the reference picture index indicating the reference picture where the reference block is positioned may be derived, and the motion vector may be derived based on the difference in position between the reference block and the current block. The encoding apparatus 100 may determine the mode applied to the current block among various prediction modes. The encoding apparatus 100 may compare RD costs for the various prediction modes and determine the optimal prediction mode for the current block.

For example, when skip mode or merge mode applies to the current block, the encoding apparatus 100 may construct a merge candidate list described below and derive a reference block, which has the minimum difference or a predetermined difference or less from the current block among the reference blocks indicated by the merge candidates included in the merge candidate list. In this case, the merge candidate associated with the derived reference block may be selected, and the merge index information indicating the selected merge candidate may be generated and signaled to the decoding apparatus 200. The motion information for the current block may be derived using the motion information for the selected merge candidate.

As an example, when (A)MVP mode applies to the current block, the encoding apparatus 100 may construct an (A)MVP candidate list and use the motion vector of the MVP candidate selected from among the motion vector predictor (MVP) candidates included in the (A)MVP candidate list as the MVP of the current block. In this case, for example, the motion vector indicating the reference block derived by the above-described motion estimation may be used as the motion vector of the current block, and the MVP candidate having the motion vector with the smallest difference from the motion vector of the current block among the MVP candidates may be the selected MVP candidate. The motion vector difference (MVD) which is the motion vector of the current block less the MVP may be derived. In this case, information for the MVD may be signaled to the decoding apparatus 200. Further, when the (A)MVP mode applies, the value of the reference picture index may be configured as reference picture index information and be separately signaled to the decoding apparatus 200.

The encoding apparatus 100 may derive residual samples based on prediction samples (S720). The encoding apparatus 100 may derive residual samples via comparison between the raw samples of the current block and the prediction samples.

The encoding apparatus 100 encodes image information including the prediction information and residual information (S730). The encoding apparatus 100 may output the encoded image information in the form of a bitstream. The prediction information may include motion information and prediction mode information (e.g., skip flag, merge flag, or mode index), as pieces of information related to the prediction procedure. The motion information may include candidate selection information (e.g., merge index, mvp flag, or mvp index) which is information for deriving the motion vector. Further, the motion information may include information for the above-described MVD and/or reference picture index information. The motion information may include information indicating whether L0 prediction, L1 prediction, or bi prediction applies. The residual information is information for residual samples. The residual information may include information for quantized transform coefficients for the residual samples.

The output bitstream may be stored in a (digital) storage medium and transferred to the decoding apparatus or may be transferred to the decoding apparatus via the network.

Meanwhile, as set forth above, the encoding apparatus may generate a reconstructed picture (including reconstructed samples and reconstructed block) based on the reference samples and the residual samples. This is for the encoding apparatus 100 to derive the same prediction result as that obtained by the decoding apparatus 200 and coding efficiency may be raised thereby. Thus, the encoding apparatus 100 may store the reconstructed picture (or reconstructed samples or reconstructed block) in the memory and use the same as the reference picture for inter prediction. As described above, e.g., in-loop filtering may further be performed on the reconstructed picture.

FIGS. 9 and 10 illustrate an inter prediction-based video/image decoding procedure and an inter predicting unit in a decoding apparatus according to an embodiment of the disclosure.

The decoding apparatus 200 may perform operations corresponding to the operations performed by the encoding apparatus 100. The decoding apparatus 200 may perform prediction on the current block based on the received prediction information and derive prediction samples.

Specifically, the decoding apparatus 200 may determine the prediction mode for the current block based on the received prediction information (S910). The decoding apparatus 200 may determine which inter prediction mode applies to the current block based on the prediction mode information in the prediction information.

For example, the decoding apparatus 200 may determine which one of the merge mode or (A)MVP mode is applied to the current block based on the merge flag. Or the decoding apparatus 200 may select one from among various inter prediction mode candidates based on the mode index. The inter prediction mode candidates may include skip mode, merge mode, and/or (A)MVP mode or other various inter prediction modes described below.

The decoding apparatus 200 derives the motion information for the current block based on the determined inter prediction mode (S920). For example, when the skip mode or merge mode applies to the current block, the decoding apparatus 200 may construct a merge candidate list described below and select one from among the merge candidates included in the merge candidate list. The selection of the merge candidate may be performed based on the merge index. The motion information for the current block may be derived from the motion information for the selected merge candidate. The motion information for the selected merge candidate may be used as motion information for the current block.

As an example, when (A)MVP mode applies to the current block, the decoding apparatus 200 may construct an (A)MVP candidate list and use the motion vector of the MVP candidate selected from among the MVP candidates included in the (A)MVP candidate list as the MVP of the current block. The selection of the MVP may be performed based on the above-described selection information (MVP flag or MVP index). In this case, the decoding apparatus 200 may derive the MVD of the current block based on information for the MVD and derive the motion vector of the current block based on the MVD and MVP of the current block. Further, the decoding apparatus 200 may derive the reference picture index of the current block based on the reference picture index information. The picture indicated by the reference picture index in the reference picture list for the current block may be derived as the reference picture referenced for inter prediction of the current block.

Meanwhile, as described below, the motion information for the current block may be derived without configuring a candidate list in which case the motion information for the current block may be derived according to a procedure initiated in the prediction mode described below. In this case, the above-described candidate list configuration may be omitted.

The decoding apparatus 200 may generate prediction samples for the current block based on the motion information for the current block (S930). In this case, the decoding apparatus 200 may derive the reference picture based on the reference picture index of the current block and derive prediction samples of the current block using the samples of the reference block indicated by the motion vector of the current block on the reference picture. In this case, prediction sample filtering may further be performed on all or some of the prediction samples of the current block according to cases, as described below.

For example, the inter prediction unit 260 of the decoding apparatus 200 may include a prediction mode determination unit 261, a motion information derivation unit 262, and a prediction sample derivation unit 263. The prediction mode determination unit 181 may determine the prediction mode for the current block based on the received prediction information, the motion information derivation unit 182 may derive the motion information (motion vector and/or reference picture index) for the current block based on information for the received motion information, and the prediction sample derivation unit 183 may derive the prediction samples of the current block.

The decoding apparatus 200 generates residual samples for the current block based on the received residual information (S940). The decoding apparatus 200 may generate reconstructed samples for the current block based on the prediction samples and residual samples and, based thereupon, generate the reconstructed picture (S950). Thereafter, in-loop filtering may further be performed on the reconstructed picture as described above.

As described above, the inter prediction procedure may include the steps of determining an inter prediction mode, deriving motion information according to the determined prediction mode, and performing prediction based on the derived motion information (generating prediction samples).

Various inter prediction modes may be used to predict the current block in the picture. For example, merge mode, skip mode, MVP mode, and affine mode may be used. Decoder side motion vector refinement (DMVR) mode and adaptive motion vector resolution (AMVR) mode may be further used as additional modes. Affine mode may also be referred to as affine motion prediction mode. MVP mode may also be referred to as advanced motion vector prediction (AMVP) mode.

Prediction mode information indicating the inter prediction mode of the current block may be signaled from the encoding apparatus to the decoding apparatus 200. The prediction mode information may be included in a bitstream and be received by the decoding apparatus 200. The prediction mode information may include index information indicating one of multiple candidate modes. Or the inter prediction mode may be indicated via hierarchical signaling of flag information. In this case, the prediction mode information may include one or more flags. For example, the encoding apparatus 100 may signal a skip flag to indicate whether to apply skip mode and, when skip mode is not applied, signal a merge flag to indicate whether to apply merge mode and, when merge mode is not applied, indicate to apply MVP mode or further signal a flag for additional discerning. Affine mode may be signaled as an independent mode or as a mode dependent upon merge mode or MVP mode. For example, affine mode may be configured as one candidate in a merge candidate list or MVP candidate list as described below.

The encoding apparatus 100 or decoding apparatus 200 may perform inter prediction using the motion information for the current block. The encoding apparatus 100 may derive the optimal motion information for the current block via a motion estimation procedure. For example, the encoding apparatus 100 may search for similar reference blocks with a high correlation, within a predetermined search range in the reference picture, on a per-fractional pixel basis, using the raw blocks in the raw picture for the current block and, based thereupon, derive motion information. The similarity of a block may be derived based on the difference between phase-based sample values. For example, the block similarity may be computed based on the sum of absolute differences (SAD) between the current block (or the template of the current block) and the reference block (or the template of the reference block). In this case, motion information may be derived based on the reference block with the smallest SAD in the search area. The derived motion information may be signaled to the decoding apparatus based on the inter prediction mode, by various methods.

When merge mode applies, the motion information for the current prediction block is not directly transmitted but is rather derived using the motion information for its neighboring prediction blocks. Thus, the encoding apparatus 100 may indicate the motion information for the current prediction block by transmitting flag information indicating that merge mode has been used and a merge index indicating what neighboring prediction block has been used.

The encoding apparatus 100 needs to search for merge candidate blocks used to derive the motion information for the current prediction block so as to fulfil merge mode. For example, up to five merge candidate blocks may be used, but embodiments of the disclosure are not limited thereto. The maximum number of merge candidate blocks may be transmitted in the slice header, but embodiments of the disclosure are not limited thereto. After discovering the merge candidate blocks, the encoding apparatus 100 may generate a merge candidate list and, among them, select the merge candidate block with the smallest cost as the final merge candidate block.

Various embodiments for merge candidate blocks constituting a merge candidate list are described herein.

The merge candidate list may use, e.g., five merge candidate blocks. For example, four spatial merge candidate and one temporal merge candidate may be put to use.

A method for configuring a reference picture list for the above-described inter prediction is described below.

A high level syntax (HLS) exists in the video coding system to control an overall sharing of common information. The HLS aims to manage frames to reduce a bit count enabling efficient use of memory. The HLS uses a reference picture management system that invokes a process denoted reference picture marking. This process labels each frame according to the usability for decoding of the current frame. Designing and implementing the HLS aims to have a simplified and efficient means to identify pictures necessary for decoding the current picture.

Embodiment 1

In this embodiment, a reference picture list (RPL) management system is introduced which is directly signaled and derived. Two lists (e.g., Reference Picture List0 and Reference Picture List1) are used. Information for deriving the two reference picture lists is signaled as syntax elements in slice headers, sequence parameter set (SPS), and picture parameter set (PPS). The two lists are generated on all types of slices. However, while the I-slice uses none of the pieces of information from the lists, the P-slice uses information from only List®, and the B-slice uses information from both the lists. The pictures are identified using picture order count (POC) numbers. Each picture may be classified as a long-term-reference-picture (LTRP) or short-term-reference-picture (STRP). The pictures classified as the LTRPs or STRPs symbolize that they are active pictures and are able to be used while decoding, and inactive pictures are ones not used during a decoding process.

FIG. 11 is a flowchart illustrating an example of constructing a reference picture list according to an embodiment of the disclosure. The operations of FIG. 11 may be performed by the decoding apparatus 200.

FIG. 11 illustrates a front part of a reference picture list configuration process. First, in step S1105, the decoding apparatus 200 parses the total number of entries in the list. Then, for each entry, the picture is marked as LTRP or STRP via a reference picture marking process (S1120). In this disclosure, marking of a picture means adding or updating information (parameter) related to the picture. Specifically, the decoding apparatus 200 initializes entry index (i)

(S1110) and, when entry index (i) is equal to or smaller than the total number of entries (S1115), performs reference picture marking (S1120). When reference picture marking is complete, the decoding apparatus updates entry index (i) (S1125). According to an embodiment of the disclosure, a brand-new architecture is proposed to enhance the reference picture management system.

FIGS. 12 and 13 are flowcharts illustrating an example of marking reference pictures according to an embodiment of the disclosure.

When rpl1_same_as_rpl0_flag is 1, the syntax structures num_ref_pic_lists_in_sps[1] and ref_pic_list_struct(1, rplsIdx) are absent, and the following applies.
    num_ref_pic_lists_in_sps[1] is inferred to have the same value as num_ref_pic_lists_in_sps[0].
    In ref_pic_list_struct(1, rplsIdx), the value of each syntax element is inferred to be identical to the value of the syntax element in ref_pic_list_struct(0, rplsIdx) for the rplsIdx which may be a value from 0 to num_ref_pic_lists_in_sps[0]−1.

TABLE 1

|  | Descriptor |
|---|---|
| ref_pic_list_struct( listIdx, rplsIdx ) { |  |
|   num_ref_entries[ listIdx ][ rplsIdx ] | ue(v) |
|   for( i = 0; i < num_ref_entries[ listIdx ][ rplsIdx ]; i++) { |  |
|     if( long_term_ref_pics_flag ) |  |
|       st_ref_pic_flag[ listIdx ][ rplsIdx ][ i ] | u(1) |
|     if( st_ref_pic_flag[ listIdx ][ rplsIdx ][ i ]) { |  |
|       abs_delta_poc_st[ listIdx ][ rplsIdx ][ i ] | ue(v) |
|       if( abs_delta_poc_st[ listIdx ][ rplsIdx ][ i ] > 0) |  |
|         strp_entry_sign_flag[ listIdx ][ rplsIdx ][ i ] | u(1) |
|     } else |  |
|       poc_lsb_lt[ listIdx ][ rplsIdx ][ i ] | u(v) |
|   } |  |
| } |  |

Table 1 shows an example of syntax configuring a reference picture list. Here, the instant embodiment provides a structure capable of managing the reference picture. The ref_pic_list_struct function receives listIdx indicated with rpl1_same_as_rpl0_flag, as a first input. In other words, when the flag (rpl1_same_as_rpl0_flag) is true, this denotes that the lists are identical, and one list (L0 or L1) may be inferred from the other (L1 or L0). A second input rplsIdx of the ref_pic_list_struct function denotes the number of reference picture lists used in the coded video sequence specified in the SPS. num_ref_entries denotes the number of entries in ref_pic_list_struct(listIdx,rplsIdx). When LRTP frames are used for each entry, the flag is parsed from the list to read whether the frame is treated as LTRP or STRP. When the entry is of the STRP and is the first STRP entry in the syntax structure ref_pic_list_struct(listIdx,rplsIdx), this denotes the absolute difference between the POC of the current picture and the POC of the picture referenced by the ith entry or, unless the ith entry is an STRP, but not the first, entry, this indicates the absolute difference between the POC of the picture referenced by the ith entry and the POC of the picture indicated by the previous STRP. (If the entry is a STRP, it is the first STRP entry in the ref_pic_list_struc (listIdx,rplsIdx) syntax structure and it specifies the absolute difference in POC of the current picture and the picture referred to by the i-th entry or when the i-th entry is an STRP entry but not the first entry, then it specifies the absolute difference between the POC of the pictured referred to by the i-th entry and by the previous STRP). When the abs_delta_poc of the ith entry is larger than 0, a flag marking code information for the STRP is signaled. However, when the st_ref_pic_flag is 0, the ith entry denotes a long term reference picture. The LTRPs are signaled by the POC least significant bit (LSB).

The syntax elements related to Table 1 may be defined as follows:
    num_ref_entries[listIdx][rplsIdx] denotes the number of entries in the ref_pic_list_struct(listIdx, rplsIdx) syntax structure. num_ref_entries[listIdx][rplsIdx] may have a value from 0 to sps_max_dec_pic_buffering_minus1+14.

When long_term_ref_pics_flag is 0, this denotes that the LTRP is not used for inter prediction of any coded picture in the coded video sequence (CVS). When long_term_ref_pics_flag is 1, this denotes that the LTRP is used for inter prediction of one or more coded pictures in the CVS.

When st_ref_pic_flag[listIdx][rplsIdx][i] is 1, the ith entry in the syntax structure ref_pic_list_struct(listIdx, rplsIdx) is an STRP entry. When st_ref_pic_flag[listIdx][rplsIdx][i] is 0, the ith entry in the syntax structure ref_pic_list_struct (listIdx, rplsIdx) is an LTRP entry. Unless present, the value of st_ref_pic_flag[listIdx][rplsIdx][i] is inferred to be 1.

abs_delta_poc_st[listIdx][rplsIdx][i] denotes the absolute difference in picture order count value between the picture referenced by the ith entry and the current picture when the ith entry is the first STRP in the syntax structure ref_pic_list_struct(listIdx, rplsIdx) or the absolute difference in picture order count value between the pictures by the previous STRP in the syntax structure ref_pic_list_struct (listIdx, rplsIdx) and the ith entry unless the ith entry is an STRP, but not the first, entry in the syntax structure ref_pic_list_struct(listIdx, rplsIdx).

abs_delta_poc_st[listIdx][rplsIdx][i] has a value from 0 to 215−1.

When strp_entry_sign_flag[listIdx][rplsIdx][i] is 1, this denotes that the ith entry in the syntax structure ref_pic_list_struct(listIdx, rplsIdx) has a value equal to or larger than 0. When strp_entry_sign_flag[listIdx][rplsIdx][i] is 0, this denotes that the ith entry in the syntax structure ref_pic_list_struct(listIdx, rplsIdx) has a value smaller than 0. Unless present, the value of strp_entry_sign_flag[i][j] is inferred to be 1.

poc_lsb_lt[listIdx][rplsIdx][i] denotes the picture order count modulo MaxPicOrderCntLsb of the picture referenced by the ith entry in the ref_pic_list_struct(listIdx, rplsIdx). The length of poc_lsb_lt[listIdx][rplsIdx][i] is log 2_max_pic_order_cnt_lsb_minus4+4 bits.

The above descriptions of the syntax elements may be summarized as in Table 2 below:

TABLE 2 num_ref_entries[ listIdx ][ rplsIdx ] specifies the number of entries in the ref_pic_list_struct( listIdx, rplsIdx ) syntax structure. The value of num_ref_entries[ listIdx ][ rplsIdx ] shall be in the range of 0 to sps_max_dec_pic_buffering_minus1 + 14, inclusive.
rpl1_same_as_rpl0_flag equal to 1 specifies that the syntax structures num_ref_pic_lists_in_sps[ 1 ] and ref_pic_list_struct( 1, rplsIdx ) are not present and the following applies:
- The value of num_ref_pic_lists_in_sps[ 1 ] is inferred to be equal to the value of num_ref_pic_lists_in_sps[ 0 ].
- The value of each of syntax elements in ref_pic_list_struct( 1, rplsIdx ) is inferred to be equal to the value of corresponding syntax element in ref_pic_list_struct( 0, rplsIdx ) for rplsIdx ranging from 0 to num_ref_pic_lists_in_sps[ 0 ] − 1.
long_term_ref_pics_flag equal to 0 specifies that no LTRP is used for inter prediction of any coded picture in the CVS. long_term_ref_pics_flag equal to 1 specifies that LTRPs may be used for inter prediction of one or more coded pictures in the CVS.
st_ref_pic_flag[ listIdx ][ rplsIdx ][ i ] equal to 1 specifies that the i-th entry in the ref_pic_list_struct( listIdx, rplsIdx ) syntax structure is an STRP entry.
st_ref_pic_flag[ listIdx ][ rplsIdx ][ i ] equal to 0 specifies that the i-th entry in the ref_pic_list_struct( listIdx, rplsIdx ) syntax structure is an LTRP entry. When not present, the value of st_ref_pic_flag[ listIdx ][ rplsIdx ][ i ] is inferred to be equal to 1.
abs_delta_poc_st[ listIdx ][ rplsIdx ][ i ], when the i-th entry is the first STRP entry in ref_pic_list_struct( listIdx, rplsIdx ) syntax structure, specifies the absolute difference between the picture order count values of the current picture and the picture referred to by the i-th entry, or, when the i-th entry is an STRP entry but not the first STRP entry in the ref_pic_list_struct( listIdx, rplsIdx ) syntax structure, specifies the absolute difference between the picture order count values of the pictures referred to by the i-th entry and by the previous STRP entry in the ref_pic_list_struct( listIdx, rplsIdx ) syntax structure.
The value of abs_delta_poc_st[ listIdx ][ rplsIdx ][ i ] shall be in the range of 0 to $2^{15}$ − 1, inclusive.
strp_entry_sign_flag[ listIdx ][ rptsIdx ][ i ] equal to 1 specifies that i-th entry in the syntax structure ref_pic_list_struct( listIdx, rplsIdx ) has a value greater than or equal to 0.
strp_entry_sign_flag[ listIdx ][ rplsIdx ] equal to 0 specifies that the i-th entry in the syntax structure ref_pic_list_struct( listIdx, rplsIdx ) has a value less than 0. When not present, the value of strp_entry_sign_flag[ i ][ j ] is inferred to be equal to 1.
poc_lsb_lt[ listIdx ][ rplsIdx ][ i ] specifies the value of the picture order count modulo MaxPicOrderCntLsb of the picture referred to by the i-th entry in the ref_pic_list_struct( listIdx, rplsIdx ) syntax structure. The length of the poc_lsb_lt[ listIdx ][ rplsIdx ][ i ] syntax element is log2_max_pic_order_cnt_lsb_minus4 + 4 bits.

Referring to FIG. 12, the decoding apparatus 200 identifies whether the LTRP is used in the reference picture list entry through long_term_ref_pics_flag (S1205) and, when the LTRP is used (when long_term_ref_pics_flag is 1), parses st_ref_pic_flag (S1210) and identifies whether st_ref_pic_flag is true (S1215). When st_ref_pic_flag is true (1) (i.e., when the current entry is of the STRP), the decoding apparatus 200 parses abs_delta_poc_st. In other words, when the current entry corresponds to an STRP entry, the decoding apparatus 200 obtains the POC difference between the picture related to the current entry and the previous picture.

When long_term_ref_pics_flag is false in step S1205, the decoding apparatus immediately parses abs_delta_poc_st. Thereafter, the decoding apparatus 200 identifies whether abs_delta_poc_st is larger than 0 (S1225) and, when abs_delta_poc_st is larger than 0, parses strp_entry_sign_flag (S1230).

When st_ref_pic_flag is false (0) in step S1215, the decoding apparatus 200 parses poc_lsb_lt (S1235). In other words, when the current entry corresponds to an LTRP entry, the decoding apparatus 200 obtains the POC modulo value of the picture related to the current entry. The POC modulo value of picture is used to derive the POC value of the picture and may be combined with the POC most significant bit (MSB) to thereby derive the POC value of the picture.

The above-described process of configuring a reference picture list may be represented in two blocks as shown in FIG. 13. The operations of each block may be implemented by the same or different pieces of hardware. The decoding apparatus 200 may obtain the flag (long_term_ref_pic_flag) indicating whether the long term reference picture is used and the number of entries (num_ref_entries) (1310) and determine whether each entry is an LTRP or STRP entry (1320).

Embodiment 2

In this embodiment, limiting the num_ref_entries parameter described above in connection with Table 1 is proposed. Typically, num_ref_entries[listIdx][rplsIdx] denotes the number of entries in ref_pic_list_struct(listIdx,rplsIdx). It is identified that num_ref_entries may have a value from 0 to sps_max_dec_pic_buffering_minus1+14. To use fewer frames, the range of num_ref_entries may be limited. The worst case scenario arises when 14 more frames are demanded than the value indicated by sps_max_dec_pic_buffering_minus1. This means that the decoding picture buffer is required to have sufficient memory to store so many frames. Instead of doing so, imposing a limit on the hierarchical groups of structures (GOPs) may be adopted considering the layer's temporalId (temporal ID).

Additional syntax may be defined as shown in Table 3. sps_max_dec_pic_buffering_minus1 plus 1, as the unit of picture storage buffer, denotes the maximum required size of one decoding picture buffer in the CVS. sps_max_dec_pic_buffering_minus1 may have a value from 0 to MaxDpbSize−1, and MaxDpbSize may be separately defined.

TABLE 3 sps_max_dec_pic_buffering_minus1 plus 1 specifies the maximum required size of the decoded picture buffer for the CVS in units of picture storage buffers. The value of sps_max_dec_pic_buffering_minus1 shall be in the range of 0 to MaxDpbSize − 1, inclusive, where MaxDpbSize is as specified somewhere else.

In other words, the number of entries in the reference picture list may have the maximum value as the maximum required size of the decoded picture buffer plus 14. Further, according to the instant embodiment (embodiment 2), the number of entries in the reference picture list may have the maximum value as the maximum required size of the decoded picture buffer.

Embodiment 3

In the instant embodiment, a method of removing the syntax element long_term_ref_pics_flag from ref_pic_list_struct(listIdx,rplsIdx) is proposed. When the syntax element (long_term_ref_pics_flag is 0, this denotes that the LTRP is not any longer used for inter prediction of any coded picture in the CVS. When long_term_ref_pics_flag is 1, this denotes that the LTRP is used for inter prediction of one or more coded filters in the CVS. By removing the syntax element long_term_ref_pics_flag, it may be inferred that the LTRP is used, as default, in the CVS. This is useful since the LTRPs are generally high-reliable pictures in the DPB.

Embodiment 4

FIG. 14 is a flowchart illustrating another example of marking reference pictures according to an embodiment of the disclosure.

Another embodiment for ref_pic_list_struct(listIdx, rplsIdx) is provided. In particular, ref_pic_list_struct(listIdx, rplsIdx) may be configured considering when the LTRP and STRP are signaled separately. This may be presented as in Table 4 below. Here, according to an embodiment of the disclosure, there is provided of a method of limiting num_strp_entries[listIdx][rplsIdx], which indicates the total number of STRPs used, and num_ltrp_entries[listIdx][rplsIdx], which indicates the total number of LTRPs.

FIG. 14 illustrates an overview of the proposed structure in which the LTRP count and the STRP count are separately signaled. Here, the STRP and LTRP counts are first parsed using the LTRP according to long_term_ref_pics_flag. Thereafter, for each entry, lt_ref_pic_flag is parsed, which indicates whether the picture is an LTRP. When lt_ref_pic_flag is true, the LTRP count increases. Otherwise, the STRP count increases. When lt_ref_pic_flag is false, the STRP is identified by parsing delta_poc_st and its code information (when delta_poc_st is larger than 0). Otherwise, the LTRP is identified by the LSB POC.

Table 4 below shows an example of syntax for configuring a reference picture list according to an embodiment.

TABLE 4

| | Descriptor |
|---|---|
| ref_pic_list_struct( listIdx, rplsIdx ) { | |
|   num_strp_entries[ listIdx ][ rplsIdx ] | ue(v) |
|   if( long_term_ref_pics_flag ) | |
|     num_ltrp_entries[ listIdx ][ rplsIdx ] | ue(v) |
|   for( i = 0, numLtrps = 0, numStrps = 0; i < NumEntriesInList[ listIdx ][ rplsIdx ]; i++) { | |
|     if( num_ltrp_entries[ listIdx ][ rplsIdx ] > 0 && | |
|       numStrps < num_strp_entries[ listIdx ][ rplsIdx ] && | |
|       numLtrps < num_ltrp_entries[ listIdx ][ rplsIdx ] ) | |
|       lt_ref_pic_flag[ listIdx ][ rplsIdx ][ i ] | u(1) |
| // Add the following inference to the semantics: | |
| // When not present, the vlaue of lt_ref_pic_flag[ listIdx ][ rplsIdx ] [ i ] is inferred as follows: | |
| // If num_ltrp_entries[ listIdx ][ rplsIdx ] is equal to 0, the value is inferred to be equal to 0. | |
| // Otherwise, the value is inferred to be equal to 0 when numLtrps is equal to num_ltrp_entries[ listIdx ][ rplsIdx ], and 0 when numStrps is equal to num_strp_entries[ listIdx ][ rplsIdx ]. | |
|     if( lt_ref_pic_flag[ listIdx ][ rplsIdx ][ i ] ) | |
|       numLtrps++ | |
|     Else | |
|       numStrps++ | |
|     if( !lt_ref_pic_flag[ listIdx ][ rplsIdx ][ i ] ) { | |
|       delta_poc_st[ listIdx ][ rplsIdx ][ i ] | ue(v) |
|       if( delta_poc_st[ listIdx ][ rplsIdx ][ i ] > 0) | |
|         strp_entry_sign_flag[ listIdx ][ rplsIdx ][ i ] | u(1) |
|     } else | |
|       poc_lsb_lt[ listIdx ][ rplsIdx ][ i ] | u(v) |
|   } | |
| } | | num_strp_entries[listIdx][rplsIdx] denotes the number of STRP entries in ref_pic_list_struct(listIdx, rplsIdx).

num_ltrp_entries[listIdx][rplsIdx] denotes the number of LTRP entries in ref_pic_list_struct(listIdx, rplsIdx).

When lt_ref_pic_flag[listIdx][rplsIdx] is absent, the lt_ref_pic_flag[listIdx][rplsIdx] value is inferred as follows.

When num_ltrp_entries[listIdx][rplsIdx] is 0, the value (lt_ref_pic_flag[listIdx][rplsIdx]) is inferred to be 0. Otherwise, it is inferred as when numLtrps(the number of LTRPs) is equal to num_ltrp_entries[listIdx][rplsIdx] and as 0 when numStrps(the number of STRPs) is equal to num_strp_entries[listIdx][rplsIdx].

TABLE 5 num_strp_entries[ listIdx ][ rplsIdx ]   specifies the number of STRP entries in the
ref_pic_list_struct( listIdx, rplsIdx ) syntax structure.
num_ltrp_entries[ listIdx ][ rplsIdx ]   specifies the number of LTRP entries in the
ref_pic_list_struct( listIdx, rplsIdx ) syntax structure.
lt_ref_pic_flag[ listIdx ][ rplsIdx ]   When not present, the value of
lt_ref_pic_flag[ listIdx ][ rplsIdx ][ i ] is inferred as follows:
If num_ltrp_entries[ listIdx ][ rplsIdx ] is equal to 0, the value is inferred to be equal to 0.
Otherwise, the value is inferred to be equal to 0 when numLtrps is equal to
num_ltrp_entries[ listIdx ][ rplsIdx ], and 0 when numStrps is equal to num_strp_entries[ listIdx ][ rplsIdx ].

Referring to FIG. 14, the decoding apparatus 200 starts to construct a reference list (S1405) and parses the number of STRP entries (num_strp_entries) (S1410). The decoding apparatus identifies whether the LTRP is used (S1415) and, when the LTRP is used, parses the number of LTRPs (num_ltrp_entries) (S1420). The decoding apparatus 200 initializes variable i, numLtrps, and numStrps to 0 (S1425), determines whether variable i is equal to or smaller than the number of entries (num_ref_entires) (S1430) and, when i is equal to or smaller than the number of entries (num_ref_entires) performs a reference picture marking operation (S1435) and updates i (S1440).

FIG. 15 is a flowchart illustrating an example of processing video signals according to an embodiment of the disclosure. The operations of FIG. 15 may be performed by the decoding apparatus 200.

In step S1510, the decoding apparatus 200 constructs a reference picture list of the current picture in a video signal. The decoding apparatus 200 obtains the POC difference (e.g., abs_delta_poc_st) between the picture related to the first entry and the prior picture when the first entry of the reference picture list corresponds to an STRP entry and, when the second entry of the reference picture list corresponds to an LTRP entry, obtains the POC modulo value (e.g., poc_lsb_lt) of the picture related to the second entry.

According to an embodiment, in the process of configuring the reference picture list, the decoding apparatus 200 may obtain the number of entries (num_ref_entries) in the reference picture list and perform reference picture marking with LTRP or STRP on each entry in the reference picture list as many times as the number of entries.

According to an embodiment, the maximum number of entries may be the maximum required size of decoding picture buffer plus 14 (e.g., sps_max_dec_pic_buffering_minus1+14) or the maximum required size of the decoding picture buffer (e.g., sps_max_dec_pic_buffering_minus1).

According to an embodiment, in the process of performing reference picture marking, the decoding apparatus 200 may obtain the number of STRP entries (e.g., num_strp_entries) and the number of LTRP entries (e.g., num_ltrp_entries) as shown in Table 4, perform STRP marking as many times as the number of STRPs and LTRP marking as many times as the number of LTRP entries.

According to an embodiment, in the process of configuring the reference picture list, the decoding apparatus 200 may obtain a first flag and determine whether the entry in the reference picture list is an STRP or LTRP entry based on the first flag. For example, the decoding apparatus 200 may determine whether the current entry is an STRP or LTRP entry using the flag (e.g., st_ref_pic_flag) indicating whether the picture related to the current entry corresponds to the STRP.

According to an embodiment, the POC difference denotes the absolute value of the POC of the prior picture minus the POC of the picture related to the first entry. When the absolute value (absolute POC difference) (e.g., abs_delta_poc_st) is larger than 0, the decoding apparatus 200 may obtain a second flag (e.g., strp_entry_sign_flag) indicating the sign of the POC difference.

In step S1520, the decoding apparatus 200 performs prediction on the current picture using the reference picture list. For example, the decoding apparatus 200 may generate prediction samples using the sample value indicated by the motion vector in the reference picture included in the first reference picture list (L0) or the second reference picture list (L1).

Embodiments of the disclosure provide a method and device for encoding information necessary for constructing a reference picture list. The encoding apparatus 100 may construct a reference picture list and perform prediction using the reference picture in the reference picture list.

Further, for each entry in the reference picture list, the encoding apparatus 100 may code information for configuring the reference picture list, per entry. For example, information for configuring the reference picture list includes the difference (e.g., abs_delta_poc_st) in POC between the picture corresponding to the STRP and the prior picture and includes the POC modulo value (e.g., poc_lsb_lt) of the picture corresponding to the LTRP.

The encoding apparatus 100 may include a first flag (e.g., st_ref_pic_flag) for indicating whether the picture of the entry in the reference picture list is of the STRP or LTRP in the information for configuring the reference picture list and perform coding. Additionally, when the POC difference (예, abs_delta_poc_st) is larger than 0, a second flag (e.g., strp_entry_sign_flag) may be included to indicate the sign of the POC difference. The information for configuring the reference picture list may be included in the SPS, PPS, or slice header and be signaled.

The processing methods to which embodiments of the disclosure are applied may be produced in the form of a program executed on computers and may be stored in computer-readable recording media. Multimedia data with the data structure according to the disclosure may also be stored in computer-readable recording media. The computer-readable recording media include all kinds of storage devices and distributed storage devices that may store computer-readable data. The computer-readable recording media may include, e.g., Blu-ray discs (BDs), universal serial bus (USB) drives, ROMs, PROMs, EPROMs, EEPROMs, RAMs, CD-ROMs, magnetic tapes, floppy disks, and optical data storage. The computer-readable recording media may include media implemented in the form of carrier waves (e.g., transmissions over the Internet). Bitstreams generated by the encoding method may be stored in computer-readable recording media or be transmitted via a wired/wireless communication network.

The embodiments of the disclosure may be implemented as computer programs by program codes which may be executed on computers according to an embodiment of the disclosure. The computer codes may be stored on a computer-readable carrier.

Decoding devices and encoding apparatuses to which embodiments of the disclosure are applied may include digital devices. The digital devices encompass all kinds or types of digital devices capable of performing at least one of transmission, reception, processing, and output of, e.g., data, content, or services. Processing data, content, or services by a digital device includes encoding and/or decoding the data, content, or services. Such a digital device may be paired or connected with other digital device or an external server via a wired/wireless network, transmitting or receiving data or, as necessary, converting data.

The digital devices may include, e.g., network TVs, hybrid broadcast broadband TVs, smart TVs, internet protocol televisions (IPTVs), personal computers, or other standing devices or mobile or handheld devices, such as personal digital assistants (PDAs), smartphones, tablet PCs, or laptop computers.

As used herein, "wired/wireless network" collectively refers to communication networks supporting various communication standards or protocols for data communication and/or mutual connection between digital devices or between a digital device and an external server. Such wired/wireless networks may include communication networks currently supported or to be supported in the future and communication protocols for such communication networks and may be formed by, e.g., communication standards for wired connection, including USB (Universal Serial Bus), CVBS (Composite Video Banking Sync), component, S-video (analog), DVI (Digital Visual Interface), HDMI (High Definition Multimedia Interface), RGB, or D-SUB and communication standards for wireless connection, including Bluetooth, RFID (Radio Frequency Identification), IrDA(infrared Data Association), UWB (Ultra-Wideband), ZigBee, DLNA (Digital Living Network Alliance), WLAN (Wireless LAN) (Wi-Fi), Wibro (Wireless broadband), Wimax (World Interoperability for Microwave Access), HSDPA (High Speed Downlink Packet Access), LTE (Long Term Evolution), or Wi-Fi Direct.

The above-described embodiments regard predetermined combinations of the components and features of the disclosure. Each component or feature should be considered as optional unless explicitly mentioned otherwise. Each component or feature may be practiced in such a manner as not to be combined with other components or features. Further, some components and/or features may be combined together to configure an embodiment of the disclosure. The order of the operations described in connection with the embodiments of the disclosure may be varied. Some components or features in an embodiment may be included in another embodiment or may be replaced with corresponding components or features of the other embodiment. It is obvious that the claims may be combined to constitute an embodiment unless explicitly stated otherwise or such combinations may be added in new claims by an amendment after filing.

When implemented in firmware or hardware, an embodiment of the disclosure may be implemented as a module, procedure, or function performing the above-described functions or operations. The software code may be stored in a memory and driven by a processor. The memory may be positioned inside or outside the processor to exchange data with the processor by various known means.

It is apparent to one of ordinary skill in the art that the disclosure may be embodied in other specific forms without departing from the essential features of the disclosure. Thus, the above description should be interpreted not as limiting in all aspects but as exemplary. The scope of the disclosure should be determined by reasonable interpretations of the appended claims and all equivalents of the disclosure belong to the scope of the disclosure.

INDUSTRIAL AVAILABILITY

The above-described preferred embodiments of the disclosure have been provided for illustration purposes, and it will be easily appreciated by one of ordinary skill in the art that various changes or changes may be made thereto or may add or be replaced with other embodiments, without departing from the technical spirit and scope of the disclosure as defined in the appended claims.

The invention claimed is:

1. A method for decoding a video signal by a device, comprising:
    obtaining a number of entries included in a reference picture list of a current picture;
    marking each of entries of the reference picture list as a short-term reference picture (STRP) or a long-term reference picture (LTRP) by the number of entries; and
    deriving prediction samples for the current picture based on the reference picture list,
    wherein the number of entries has a maximum value as a maximum required size of a decoded picture buffer plus 14.

2. The method of claim 1, wherein marking each of entries further comprises:
    obtaining a picture order count (POC) difference between a reference picture related to an entry marked as the STRP and another picture in the reference picture list; and
    obtaining a POC modulo value of a picture related to an entry marked as the LTRP.

3. The method of claim 2, wherein the POC difference is an absolute value of a POC of the another picture minus a POC of the reference picture related to the entry marked as the STRP.

4. The method of claim 3, wherein marking each of entries further comprises:
    obtaining a flag indicating a sign of the POC difference based on that the absolute value is greater than 0.

5. The method of claim 2, wherein the another picture is the current picture based on that the entry marked as the STRP is a first STRP entry in the marking of each of entries of the reference picture, or the another picture is a previous STRP in the reference picture list based on that the entry marked as the STRP is not the first STRP in the marking of each of entries of the reference picture.

6. The method of claim 1, wherein marking each of entries comprises:
    obtaining a number of STRP entries and LTRP entries; and
    performing a STRP marking by the number of STRP entries, and performing a LTRP marking by the number of LTRP entries.

7. The method of claim 1, wherein marking each of entries comprises:
    obtaining a flag including information about whether an entry of the reference picture list corresponds to an STRP entry or an LTRP entry; and
    determining whether the entry of the reference picture list corresponds to the STRP entry or the LTRP entry based on the flag.

8. A method of encoding a video signal by a device, comprising:
- constructing a reference picture list of a current picture; and
- generating code information for constructing the reference picture list,
- wherein the code information comprises a number of entries of the reference picture list, and
- wherein the number of entries has a maximum value as a maximum required size of a decoded picture buffer plus 14.

9. The method of claim 8, wherein the code information further comprises:
- a picture order count (POC) difference between a reference picture related to an entry marked as a short-term reference picture (STRP) and another picture in the reference picture list; and
- a POC modulo of a picture related to an entry marked as a long-term reference picture (LTRP) in the reference picture list.

10. The method of claim 9, wherein the POC difference is an absolute value of a POC of the another picture minus a POC of the reference picture related to the entry marked as the STRP.

11. The method of claim 10, wherein the code information further comprises a flag indicating a sign of the POC difference for an entry of which the absolute value of the POC difference is greater than 0.

12. The method of claim 9, wherein the another picture is the current picture based on that the entry marked as the STRP is a first STRP entry in the code information, or the another picture is a previous STRP in the reference picture list based on that the entry marked as the STRP is not the first STRP in the code information.

13. The method of claim 8, wherein the code information further comprises a flag including information about whether an entry of the reference picture list corresponds to an STRP entry or an LTRP entry.

14. The method of claim 8, further comprising:
- loading the code information in a sequence parameter set (SPS), picture parameter set (PPS), or slice header in a bitstream related to the video signal.

15. A non-transitory computer-readable medium for storing a bitstream generated by an encoding device and executable by a decoding device, the bit stream comprising:
- code information for constructing a reference picture list and marking each of entries of the reference picture list as a short-term reference picture (STRP) or a long-term reference picture (LTRP),
- wherein the code information comprises:
- a number of entries of the reference picture list;
- a picture order count (POC) difference between a reference picture related to an entry of the reference picture list marked as the STRP and another picture in the reference picture list; and
- a POC modulo of a picture related to an entry marked as the in the reference picture list,
- wherein the number of entries has a maximum value as a maximum required size of a decoded picture buffer plus 14.

16. The medium of claim 15, wherein the POC difference is an absolute value of a POC of the another picture minus a POC of the reference picture related to the entry marked as the STRP.

17. The medium of claim 16, wherein the code information further comprises a flag indicating a sign of the POC difference for an entry of which the absolute value of the POC difference is greater than 0.

18. The medium of claim 15, wherein the another picture is the current picture based on that the entry marked as the STRP is a first STRP entry in the marking of each of entries of the reference picture, or the another picture is a previous STRP in the reference picture list based on that the entry marked as the STRP is not the first STRP in the marking of each of entries of the reference picture.

19. The medium of claim 15, wherein the code information further comprises a flag including information about whether an entry of the reference picture list corresponds to an STRP entry or an LTRP entry.

20. The medium of claim 15, wherein the code information is included in a sequence parameter set (SPS), picture parameter set (PPS), or slice header included in the bitstream.

* * * * *